United States Patent [19]

Hirano et al.

[11] Patent Number: 5,677,798
[45] Date of Patent: Oct. 14, 1997

[54] IMAGE FORMING LENS SYSTEM

[75] Inventors: Hiroyuki Hirano; Takayuki Ito; Takashi Iizuka, all of Tokyo, Japan

[73] Assignee: Asahi Kogaku Kogyo Kabushiki Kaisha, Tokyo, Japan

[21] Appl. No.: 330,663

[22] Filed: Oct. 28, 1994

[30] Foreign Application Priority Data

| Oct. 28, 1993 | [JP] | Japan | 5-270290 |
| Dec. 24, 1993 | [JP] | Japan | 5-328865 |
| Apr. 18, 1994 | [JP] | Japan | 6-078504 |
| Jul. 22, 1994 | [JP] | Japan | 6-171240 |

[51] Int. Cl.$^6$ .............. G02B 13/18; G02B 9/08
[52] U.S. Cl. .............. 359/717; 359/740; 359/794; 359/795
[58] Field of Search .............. 359/717, 794, 359/739, 740, 795

[56] References Cited

U.S. PATENT DOCUMENTS

| 895,045 | 8/1908 | Rudolph | 359/740 |
| 3,552,833 | 1/1971 | Marquardt | 359/740 |
| 4,721,373 | 1/1988 | Sugiyama | 359/796 |
| 4,932,764 | 6/1990 | Simpson | 359/794 |
| 5,000,552 | 3/1991 | Simpson, Jr. et al. | 359/794 |
| 5,067,803 | 11/1991 | Ohno | 359/794 |
| 5,166,830 | 11/1992 | Ishibai et al. | 359/717 |
| 5,173,809 | 12/1992 | Iwaki et al. | 359/784 |
| 5,214,537 | 5/1993 | Maruyama | 359/643 |
| 5,251,069 | 10/1993 | Iizuka | 359/717 |
| 5,293,270 | 3/1994 | Hirano et al. | 359/760 |

FOREIGN PATENT DOCUMENTS

| 2811023 | 9/1978 | Germany | 359/740 |
| 1219813 | 1/1989 | Japan | |
| 2-73210 | 3/1994 | Japan | |
| 0563740 | 8/1944 | United Kingdom | 359/794 |
| 0593362 | 10/1947 | United Kingdom | 359/794 |

Primary Examiner—Scott J. Sugarman
Attorney, Agent, or Firm—Greenblum & Bernstein P.L.C.

[57] ABSTRACT

An image forming lens system including a positive front lens group, a diaphragm, and a rear lens group, in this order from an object to be imaged. The front lens group is made of optical glass. The rear lens group is made of a single meniscus plastic lens having opposed aspherical lens surfaces with a concave surface adjacent to the diaphragm. The lens system satisfies the following relationships:

$f_0 \cdot |1/f_{R-1} + 1/f_{R-2}| < 0.3$
$-4 < f_0/r_{R-1} < -0.7$
$\Delta X_{R-1}/f_0 < 0$
$\Delta X_{R-2}/f_0 < 0$
$0.1 < d_R/f_0$.

In the above, $f_{R-1}$ ($=r_{R-1}/n-1$) represents the focal length of the first surface of the plastic lens, $f_{R-2}$ ($=r_{R-2}/1-n$) represents the focal length of the second surface of the plastic lens, $f_0$ represents the focal length of the whole lens system, $n$ represents the refractive index of the plastic lens at a reference wavelength, $r_{R-1}$ represents the radius of curvature of the first surface of the plastic lens, $r_{R-2}$ represents the radius of curvature of the second surface of the plastic lens, $\Delta X_{R-1}$ represents the amount of aspheric deviation of the first surface of the plastic lens at an effective radius thereof, $\Delta X_{R-2}$ represents the amount of aspheric deviation of the second surface of the plastic lens at an effective radius thereof, and $d_R$ represents the thickness of the plastic lens.

26 Claims, 16 Drawing Sheets

FIG. 3
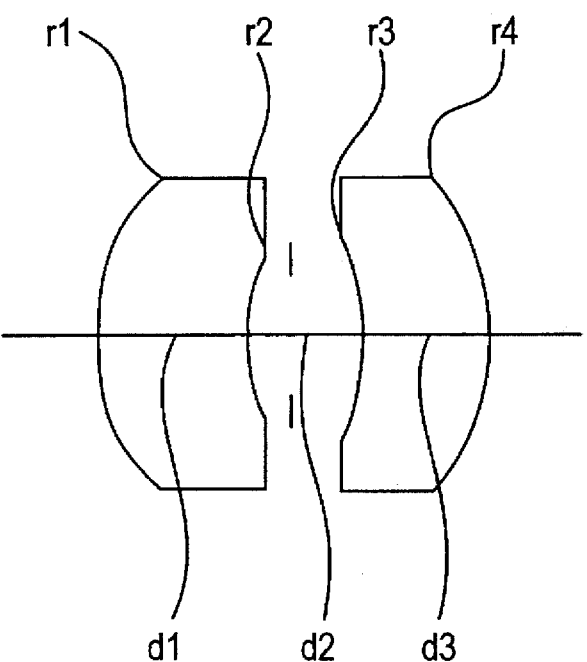
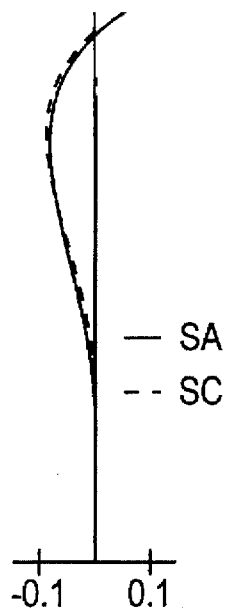
FIG. 4A
FNO 4.0
-0.1  0.1
SPHERICAL
ABERRATION
SINE CONDITION
— SA
-- SC
FIG. 4B
FNO 4.0
-0.1  0.1
SPHERICAL
ABERRATION
CHROMATIC
ABERRATION
— 567
··· 557
-- 577
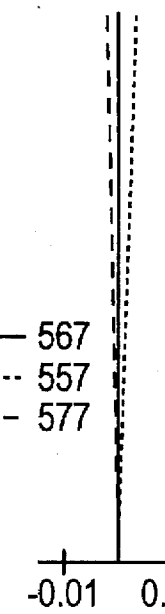
FIG. 4C
Y=12.1
-0.01  0.01
TRANSVERSE
CHROMATIC
ABERRATION
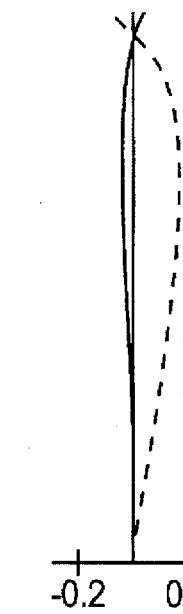
FIG. 4D
Y=12.1
-0.2  0.2
ASTIGMATISM
— S
-- M
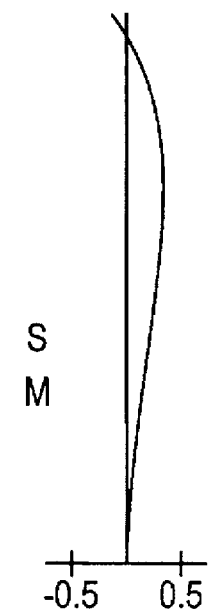
FIG. 4E
Y=12.1
-0.5  0.5 %
DISTORTION

FIG. 5
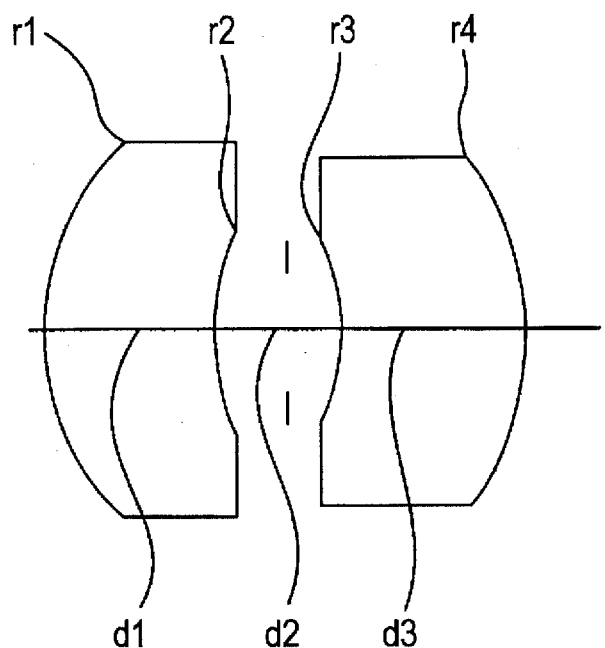
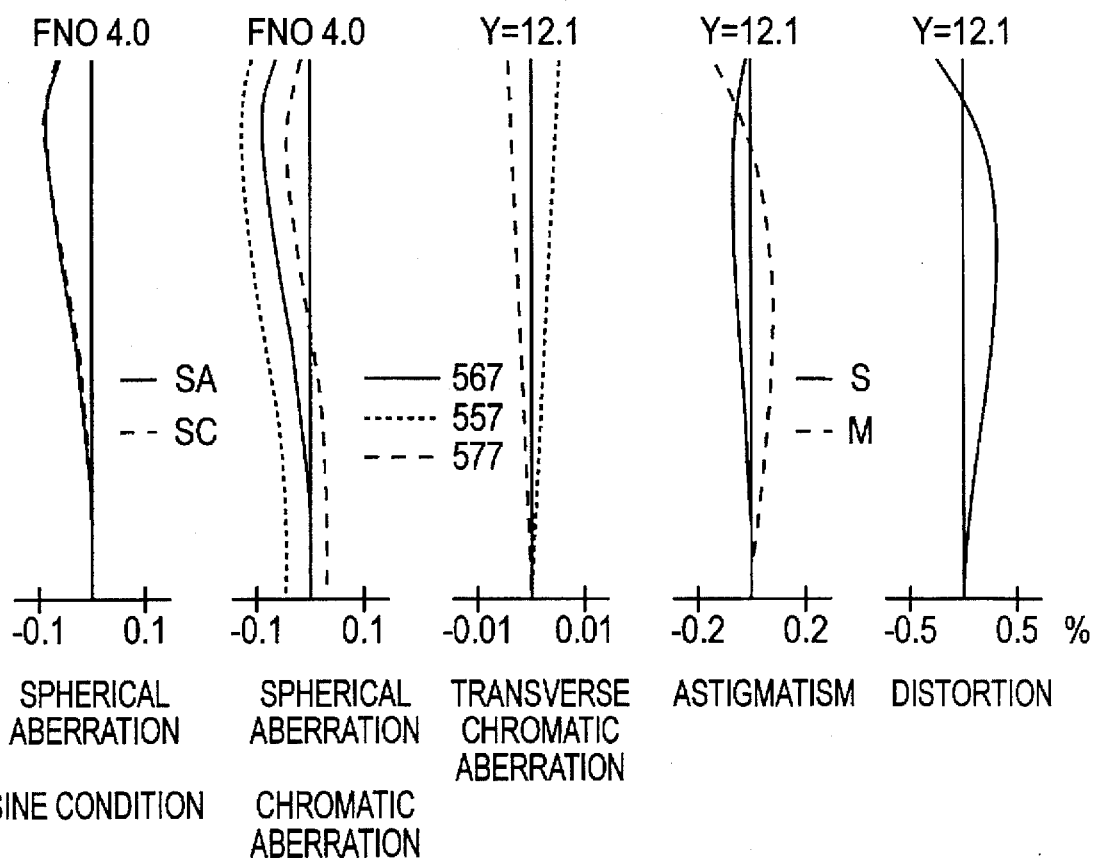
FIG. 6A  FIG. 6B  FIG. 6C  FIG. 6D  FIG. 6E

FIG. 7
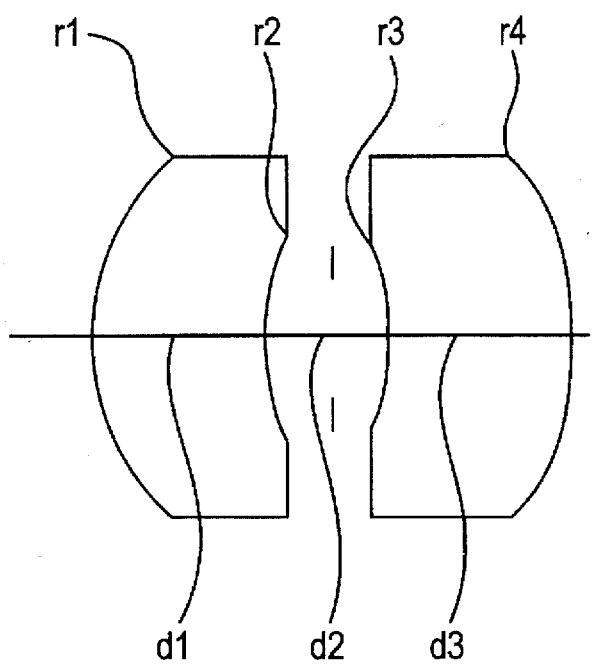
FIG. 8A FIG. 8B FIG. 8C FIG. 8D FIG. 8E
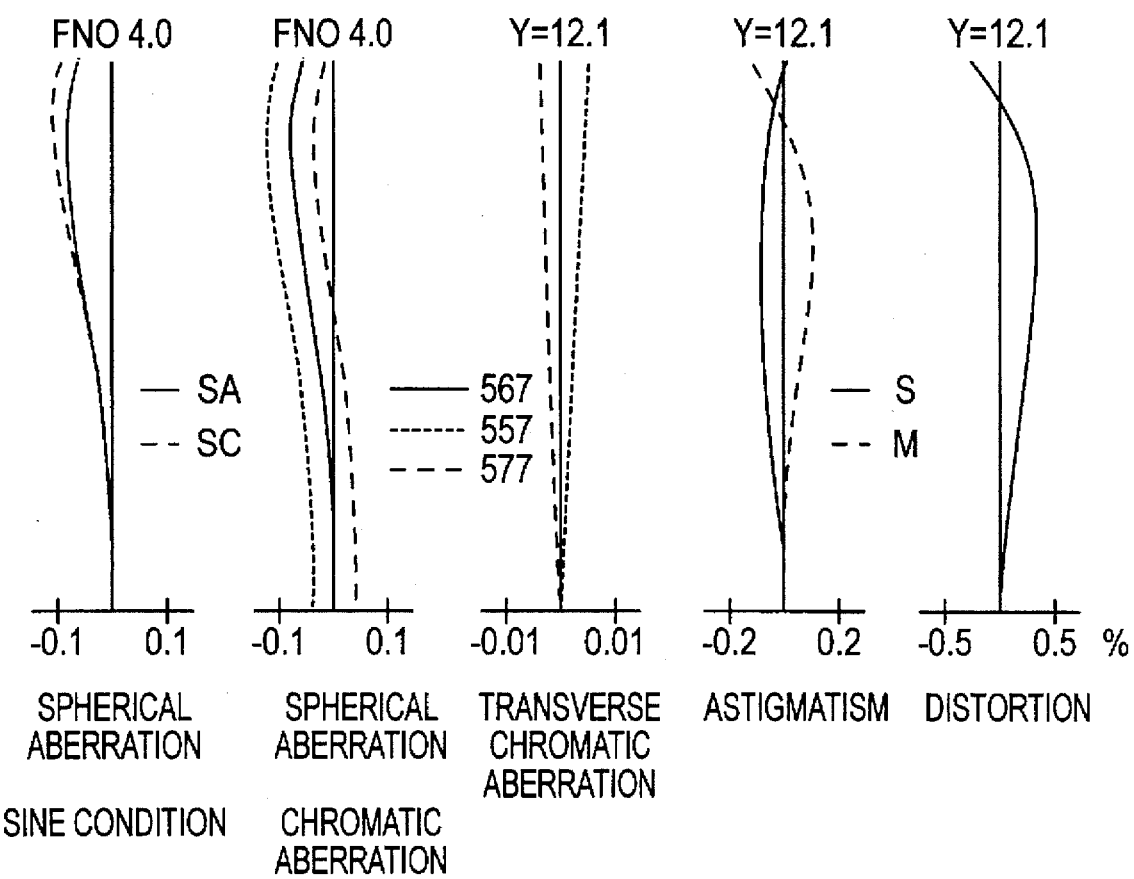

FIG. 9
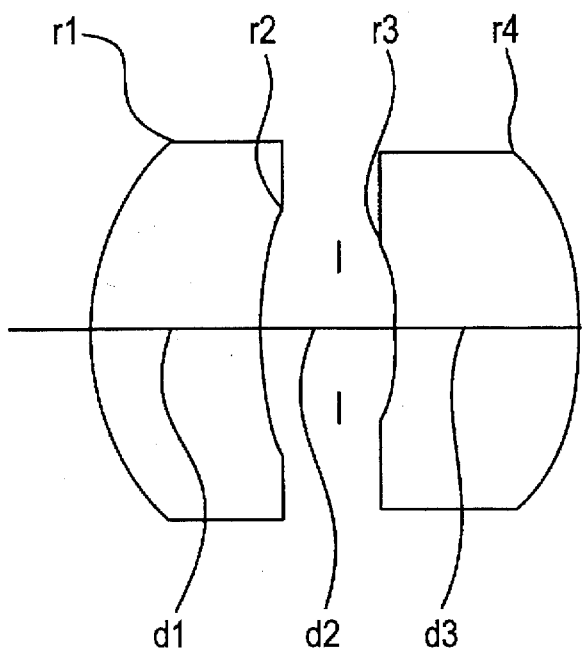
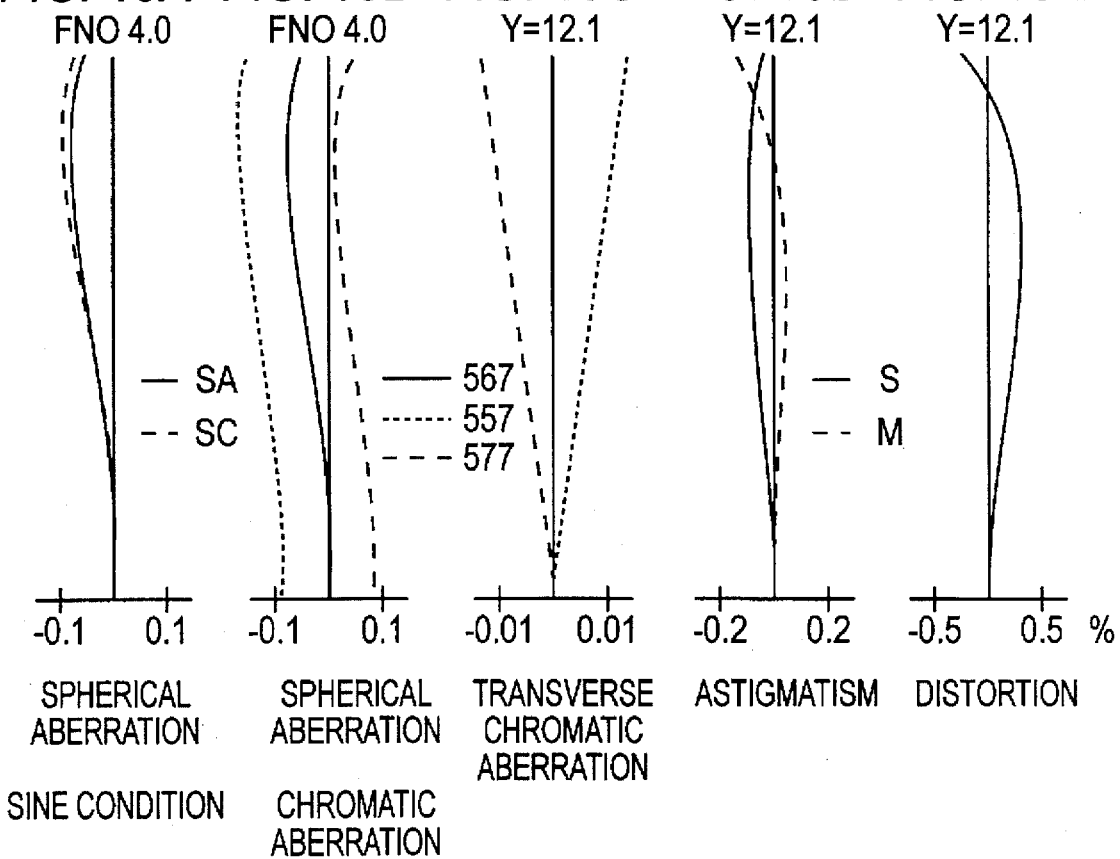
FIG. 10A  FIG. 10B  FIG. 10C  FIG. 10D  FIG. 10E
FNO 4.0 — SPHERICAL ABERRATION SINE CONDITION (SA, SC)
FNO 4.0 — SPHERICAL ABERRATION CHROMATIC ABERRATION (567, 557, 577)
Y=12.1 — TRANSVERSE CHROMATIC ABERRATION
Y=12.1 — ASTIGMATISM (S, M)
Y=12.1 — DISTORTION FIG. 17
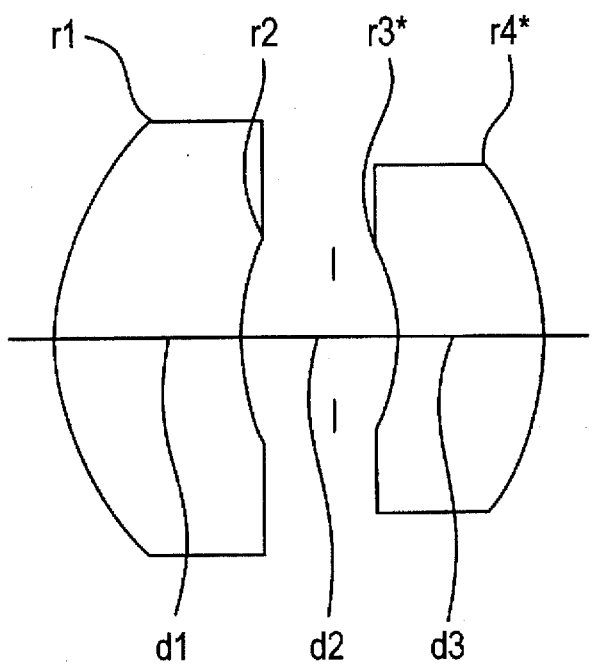
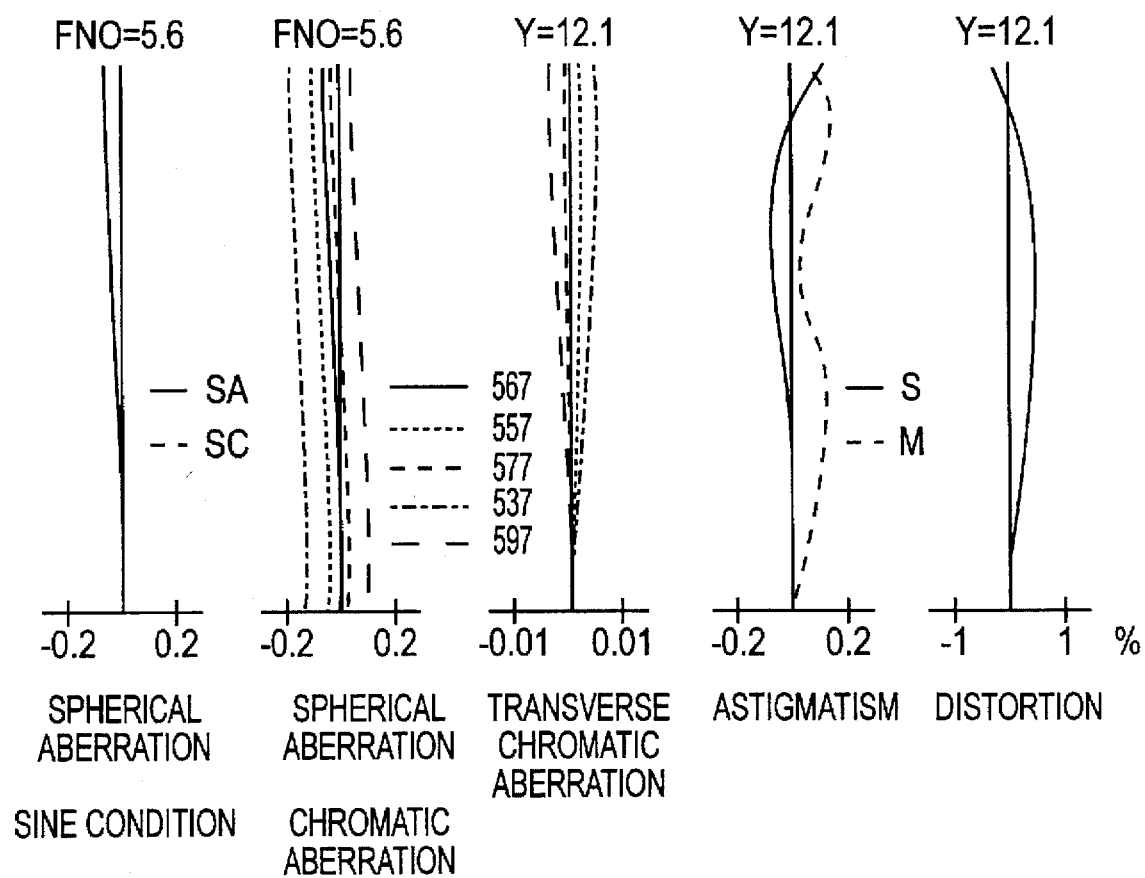
FIG. 18A   FIG. 18B   FIG. 18C   FIG. 18D   FIG. 18E

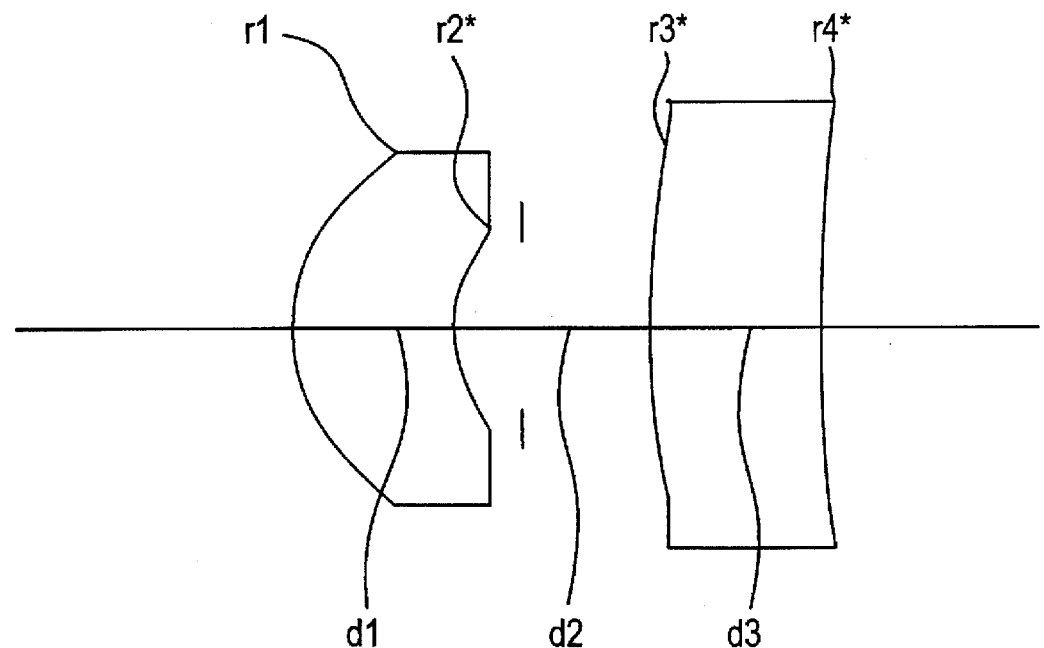
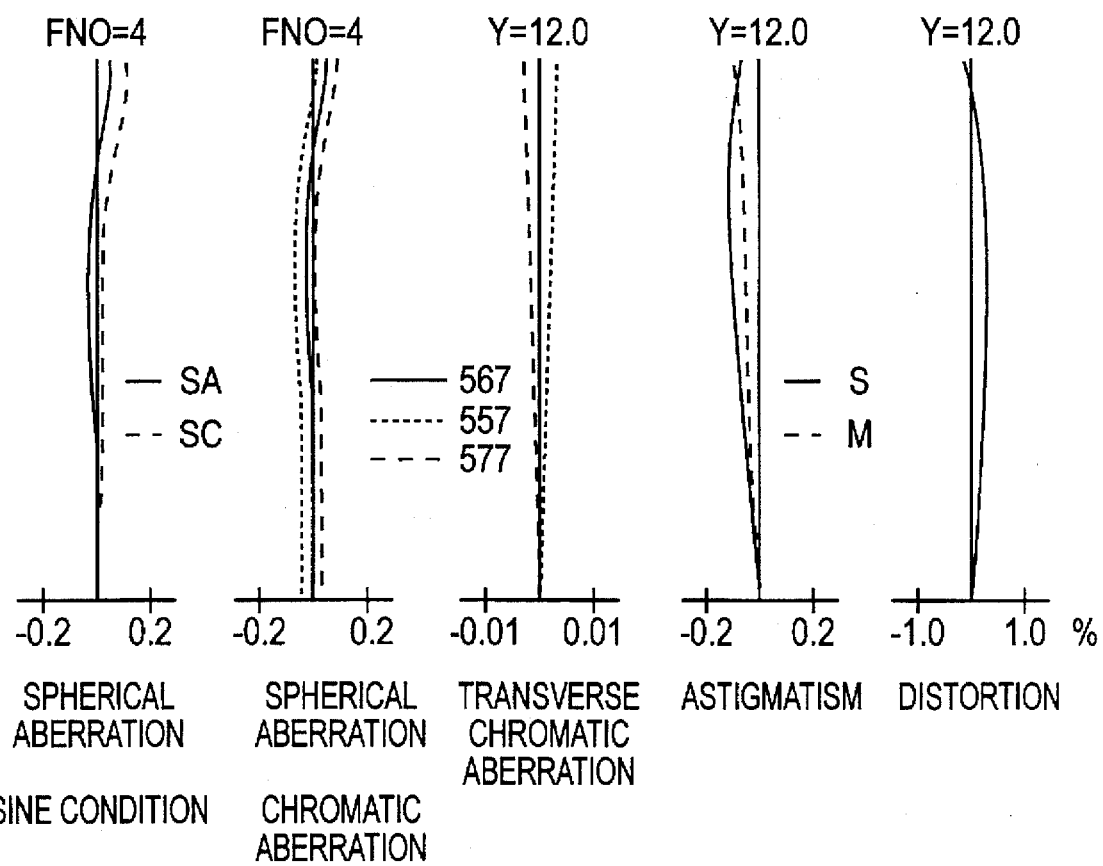

FIG. 21
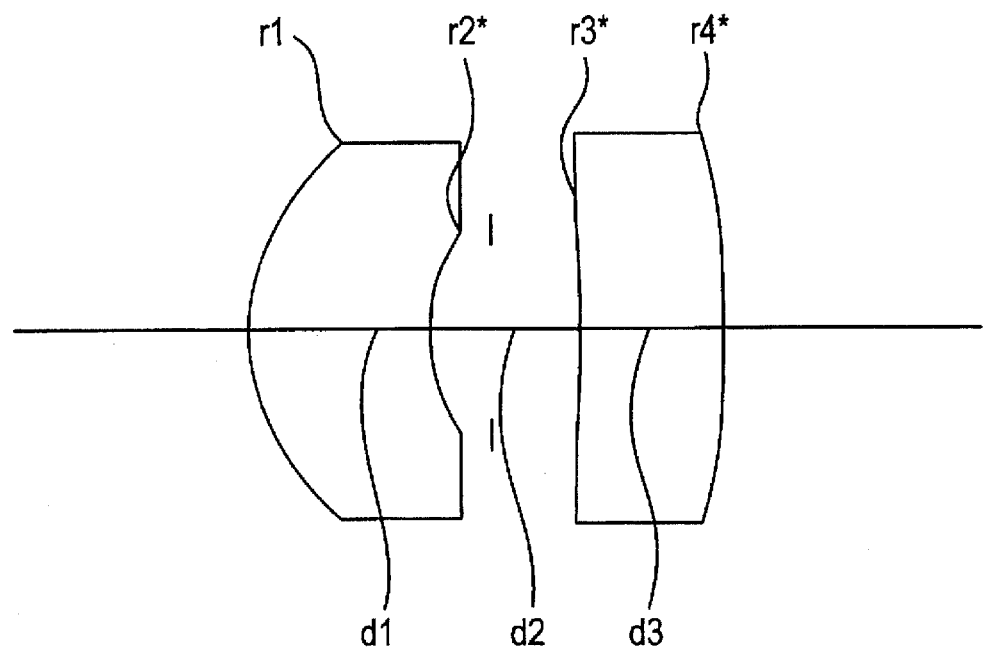
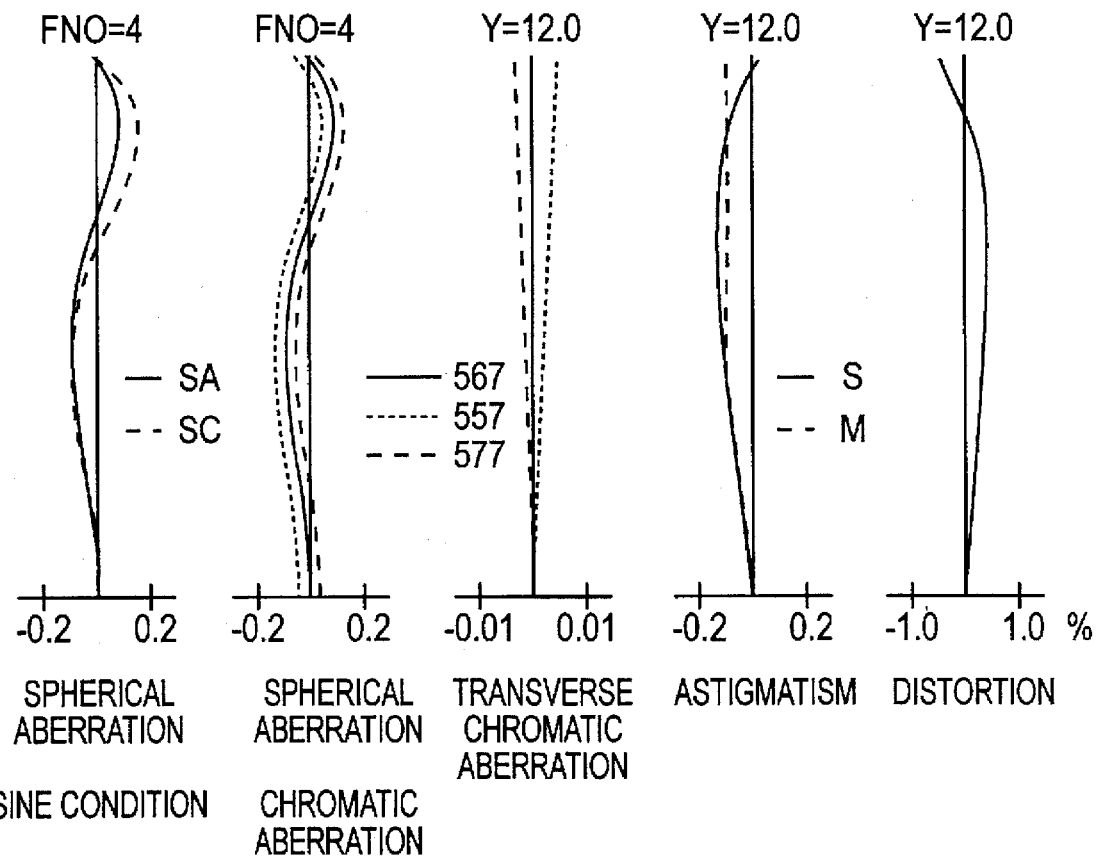

FIG. 29
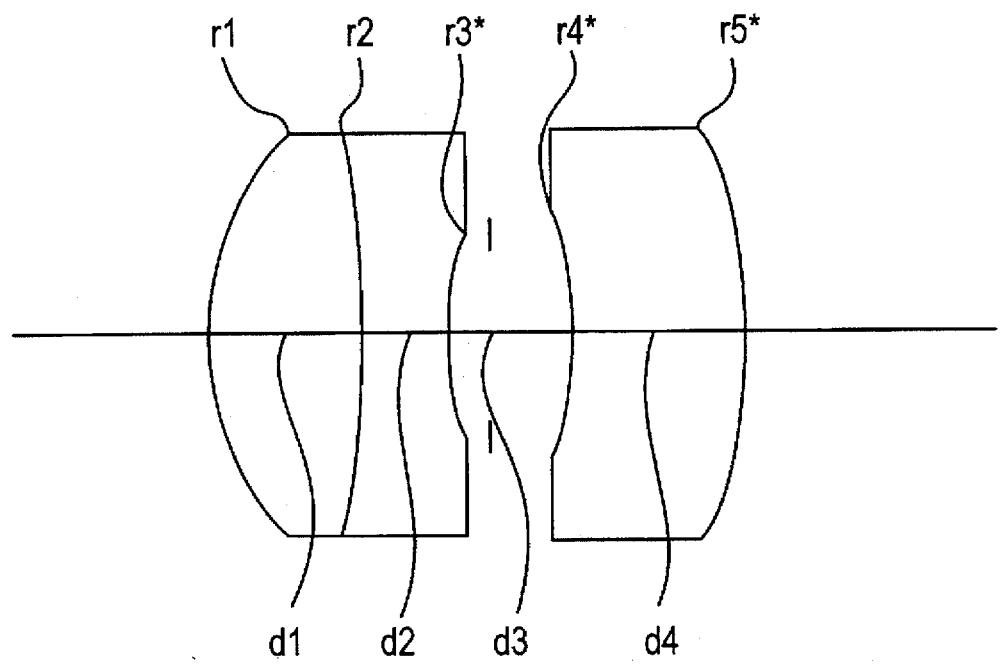
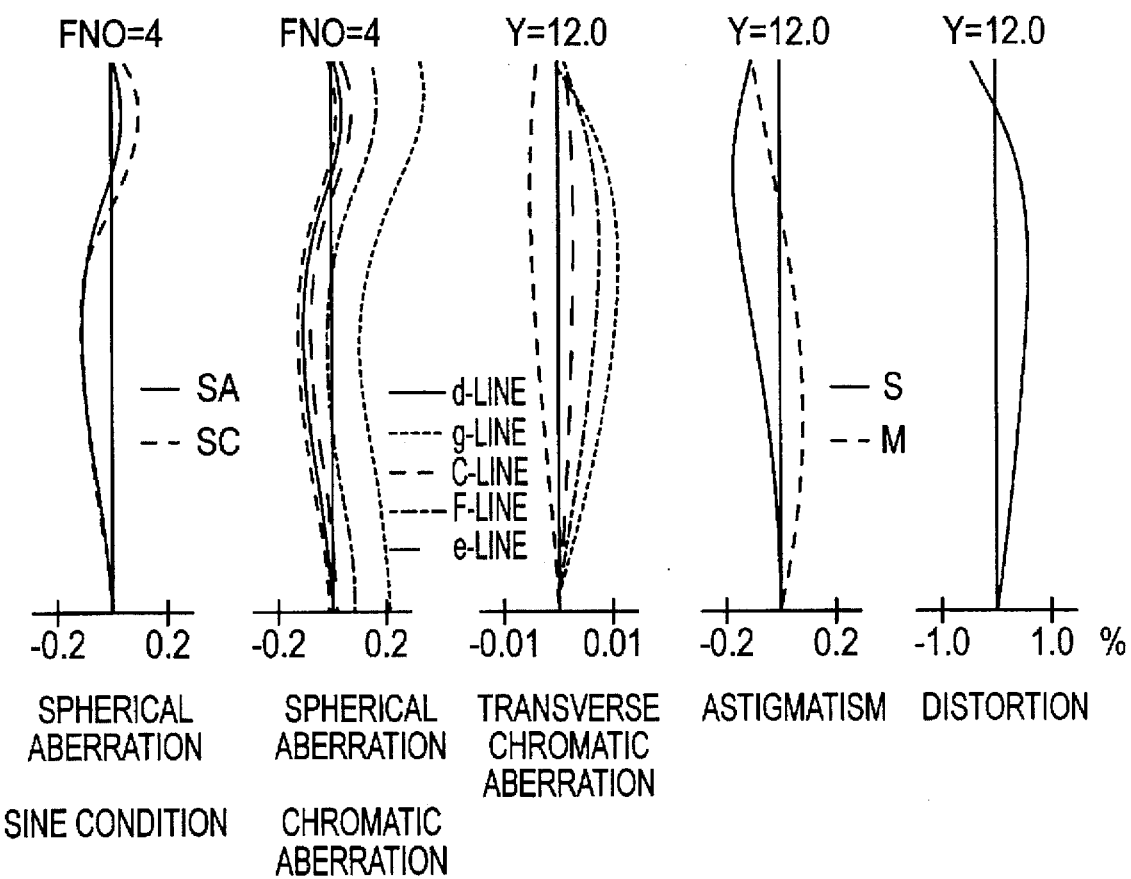

IMAGE FORMING LENS SYSTEM

BACKGROUND OF THE INVENTION

1. Field of the Invention

The present invention relates to a lens system which can be advantageously used for an optical reader in a facsimile machine.

2. Description of Related Art

A conventional reading lens system in a facsimile machine for example is usually comprised of more than two glass lenses and accordingly is expensive. For example, Japanese Unexamined Patent Publication Nos. 1-219813 and 2-73210 have proposed a use of a small number of lenses including a plastic lens or lenses. However, the lens system disclosed in JPP '813 has a large f-number which is approximately equal to 8 and a large amount of aberration. Accordingly, the lens system in JPP '813 cannot be appropriately used as a reading lens system. The subject of JPP '210 is directed to how to reduce a deviation of a focal point of the plastic lens due to a change in the temperature. There is no specific reference to the correction of aberration in JPP '210.

SUMMARY OF THE INVENTION

It is an object of the present invention to provide an inexpensive image forming lens system having a smaller number of lenses including a plastic lens (or lenses), which can be particularly advantageously used for an optical reader in a facsimile machine, for example and in which an aberration can be corrected.

In general, the variation of the coefficient of linear expansion or the refractive index of a plastic lens due to a change in temperature or humidity is larger than that for a glass lens.

Another object of the present invention is to provide an image forming lens system having a specific lens arrangement (power distribution) determined in view of the optical property mentioned above, so that there is no or little deviation of a focal point of the plastic lens due to a change in temperature or humidity.

Still another object of the present invention is to provide an image forming lens system which can be advantageously used for an LED which emits approximately monochromatic light having a wavelength distribution (band) of around ±10 nm with respect to a reference wavelength, or white light having a wavelength band of around ±100 nm, or an LED which emits light having an intermediate wavelength band of around ±30 nm.

According to the present invention, a lens system is provided which is essentially comprised of a positive front lens group, a diaphragm, and a rear lens group, arranged in this order from an object to be photographed or imaged. In summary, there are two aspects of the invention. In a first aspect of the invention, the front lens group is made of optical glass and the rear lens group is made of plastic. In a second aspect of the invention, at least one surface of the front lens group is an aspheric surface and the rear lens group is made of a plastic lens.

To achieve the objects mentioned above, according to the first aspect of the present invention, there is provided an image forming lens system comprising a positive front lens group, a diaphragm and a rear lens group, in this order from an object to be imaged. The front lens group is made of optical glass lenses, and the rear lens group is comprised of a single meniscus plastic lens having opposed aspherical lens surfaces with a concave surface adjacent to the diaphragm, and wherein the following relationships are satisfied:

(1) $f_0 \cdot |1/f_{R-1} + 1/f_{R-2}| < 0.3$
(2) $-4 < f_0/r_{R-1} < -0.7$
(3) $\Delta X_{R-1}/f_0 < 0$
(4) $\Delta X_{R-2}/f_0 < 0$
(5a) $0.1 < d_R/f_0$ wherein $f_{R-1}(=r_{R-1}/n-1)$: focal length of the first surface of the plastic lens;

$f_{R-2}(=r_{R-2}/1-n)$: focal length of the second surface of the plastic lens;

$f_0$: focal length of the whole lens system;

n: refractive index of the plastic lens at a reference wavelength;

$r_{R-1}$: radius of curvature of the first surface of the plastic lens;

$r_{R-2}$: radius of curvature of the second surface of the plastic lens;

$\Delta X_{R-1}$: amount of aspheric deviation of the first surface of the plastic lens at an effective radius thereof;

$\Delta X_{R-2}$: amount of aspheric deviation of the second surface of the plastic lens at an effective radius thereof;

$d_R$: thickness of the plastic lens.

Preferably, the aspherical lens surface of the plastic lens satisfies the following relationships:

(6) $-20 < \Delta I_{R-1} < -3$
(7) $0.2 < \Delta III_{R-2} < 1.5$ wherein, $\Delta I_{R-1}$ represents the aberration factor of the aspherical surface term of the spherical aberration factor of the first lens surface of the plastic lens, and $\Delta III_{R-2}$ represents the aberration factor of the aspherical surface term of the astigmatism factor of the second lens surface of the plastic lens.

If illuminating light is substantially monochromatic light, such as an LED, the positive front lens group is preferably made of one positive meniscus lens and satisfies the following relationship;

(8) $1.7 < N_P$ wherein, $N_P$ represents the refractive index of the positive meniscus lens at a reference wavelength.

Preferably, the image forming lens system satisfies the following relationship:

(9) $35 < \nu_P$ wherein, $\nu_P$ represents the Abbe number of the positive meniscus lens at the d-line.

If illuminating light is white light, the positive front lens group can be made of an achromatic lens system having a positive lens and a negative lens. The achromatic lens system satisfies the following relationship:

(10) $1.7 < N_P$
(11) $1.7 < N_N$
(12) $10 < \nu_P - \nu_N$ wherein, $N_P$ represents the refractive index of the positive lens of the front lens group at the d-line, $N_N$ represents the refractive index of the negative lens of the front lens group at the d-line, $\nu_P$ represents the Abbe number of the positive lens of the front lens group at the d-line, and $\nu_N$ represents the Abbe number of the negative lens of the front lens group at the d-line.

If the front lens group is made of optical glass lenses whose surfaces are all spherical lens surfaces, the manufacturing cost can be reduced.

According to a modification of the first aspect of the present invention, there is provided an image forming lens system comprising a positive front lens group, a diaphragm, and a rear lens group, in this order from an object to be imaged. The front lens group is made of one positive lens of optical glass, the rear lens group is comprised of one meniscus lens having a concave surface adjacent to the diaphragm, and wherein the following relationships are satisfied:

(1) $f_0 \cdot |1/f_{R-1} + 1/f_{R-2}| < 0.3$
(2) $-4 < f_0/r_{R-1} < -0.7$
(5a) $0.1 < d_R/f_0$
(13) $45 < v_P$
(14) $v_R < 35$ wherein $v_R$: Abbe number of the rear lens group at the d-line.

This lens system can be advantageously used particularly when an illuminating light source is an LED which emits light having an intermediate wavelength band between white light and monochromatic light.

Preferably, the rear lens group is made of a plastic lens having opposed aspherical lens surfaces and satisfies the following relationships:

(3) $\Delta X_{R-1}/f_0 < 0$
(4) $\Delta X_{R-2}/f_0 < 0$

The positive front lens group can be made of one positive meniscus lens having a concave surface adjacent to the diaphragm and satisfies the following relationship:

(8) $1.7 < N_P$

Preferably, the positive lens group is made of optical glass whose surfaces are all spherical surfaces.

The image forming lens system preferably satisfies the following relationship:

(5b) $0.1 < d_R/f_0 < 0.39$

In the image forming lens system in which a diaphragm is provided between the front lens group and the rear lens group, according to the first aspect of the invention including the modification thereof, as summarized above, the front lens group having a large power is made of optical glass, and the rear lens group having a small power is made of a plastic aspherical lens to reduce the manufacturing cost. The rear lens group is made of a meniscus lens with a concave surface facing the diaphragm, so that an astigmatism or distortion, etc., can be effectively compensated by a reduced number of lenses.

Formula (1) specifies the power of the rear plastic lens group. In general, since a coefficient of linear expansion or refractive index of a plastic lens tends to vary due to a change in the temperature or moisture in comparison with an optical glass, it is necessary to decrease the power of the plastic lens. If the value of formula (1) exceeds the upper limit, the sum of the surface powers of the plastic lens is so large that there is a large deviation of the focal point due to the change in the temperature or moisture, etc. Accordingly, the lens system cannot be properly used as a reading lens system in which the lens group is fixed after the adjustment thereof is completed. Note that the lens power is substantially identical to the sum of the surface powers of the lens when the lens thickness d is small. However, if the lens has a large thickness, the lens power is different from the sum of the surface powers. If the lens thickness is large enough to satisfy the requirement defined in formula (5a), namely, in a thick lens, the sum of the surface powers of the first and second surfaces of the lens is more closely correlated with the deviation of the focal point due to a change in temperature or moisture than the lens power.

Formula (2) specifies the radius of curvature of the first surface of the rear plastic lens group. If the value of ratio is below the lower limit, the radius of curvature is so small that an over correction of the astigmatism and distortion occurs. Moreover, the performance of the lens system can be deteriorated by an irregular shape or thickness of the lenses or a failure of an axial alignment of the lenses, etc., and hence manufacturing cost cannot be reduced. Conversely, if the ratio of the formula (2) is above upper limit, no correction of the aberration can be effected.

Formula (3) is related to the first aspheric surface of the rear plastic lens group. The amount of aspheric deviation of the concave surface is a negative value. Namely, the astigmatism and the coma caused by the positive front lens group can be corrected by the aspherical surface of the rear lens group having a negative surface power which increases toward the peripheral edge of the lens from the center portion thereof.

Formula (4) specifies the amount of the aspheric deviation of the second lens surface of the rear lens group. The amount of aspheric deviation of the convex surface is a negative value. Namely, the astigmatism and the distortion caused by the first surface of the plastic lens can be corrected by the aspherical surface of the second surface having a positive surface power which increases toward the peripheral edge of the lens from the center portion thereof.

FIG. 31 shows an aspheric deviation of an aspheric surface which is formed by providing an aspherical surface on a paraxial spherical surface (basic spherical surface). The amount of the aspheric deviation is defined by the following equation:

Amount of the aspheric deviation =
(sag amount of the basic spherical surface)
  −(sag amount of the aspherical surface).

"Sag amount" is a distance between a tangent plane to the lens normal to the optical axis and the lens surface. When the aspherical surface is located closer to the object to be imaged than the basic spherical surface, the value of the amount of the aspherical deviation is a negative value. When the aspherical surface is located closer to an object to be imaged than the basic spherical surface, the value of the amount of the aspherical deviation is a positive value.

Formulae (5a) and (5b) specify the thickness of the plastic lens. It is necessary for the plastic lens to have a thickness above the lower limit defined in formula (5a) in order that the first and second surfaces of the plastic lens can fulfill the respective functions as an aspherical surface. If the thickness is above the upper limit in formula (5b), which is advisable from the viewpoint of the correction of the aberration, the thickness is too large to produce a plastic lens. In addition, the plastic lens can be significantly influenced by a slight change in the moisture, and hence, the thick plastic lens cannot be properly used as a reading lens.

Formulae (6) and (7) are the optional requirements which are preferably satisfied in addition to the requirements defined in formulae (3) and (4) for the amount of the aspheric deviation. If the value of formula (6) exceeds the upper limit, effective correction of the spherical aberration and coma cannot be ensured. Conversely, if the value of formula (6) is below the lower limit, production of a high-order aberration results.

If the value of formula (7) is below the lower limit, effective correction of the astigmatism and distortion cannot be ensured. Conversely, if the value of formula (7) is above the upper limit, the amount of the aspheric deviation is so large that a high-order aberration is caused and there is a large variation of the astigmatism within a range from an intermediate angle of view to the maximum angle of view.

The following relationships exist between the aspherical factor and the aberration factor.

1. The shape of an aspheric surface is defined by the following equation:

$$x = cy^2/\{1+[1-(1+K)c^2y^2]^{1/2}\} + A_4y^4 + A_6y^6 + A_8y^8 + A_{10}y^{10} + \dots$$

wherein, Y represents a height above the axis,

X represents a distance from a tangent plane of an aspherical vertex,

C represents a curvature of the aspherical vertex (1/r),

K represents a conic constant, $A_4$ represents a fourth order aspherical factor, $A_6$ represents a sixth order aspherical factor, $A_8$ represents an eighth order aspherical factor, $A_{10}$ represents a tenth order aspherical factor.

2. In the equation above, the aberration factor is obtained when K=0 (Bi=Ai) as follows:

$B_4 = A_4 + KC^3/8$ $B_6 = A_6 + (K^2 + 2K)C^5/16$ $B_8 = A_8 + 5(K^3 + 3K^2 + 3K)C^7/128$ $B_{10} = A_{10} + 7(K^4 + 4K^3 + 6K^2 + 4K)C^9/256$

Thus, we have:

$$x = cy^2/\{1+[1-c^2y^2]^{1/2}\} + B_4y^4 + B_6y^6 + B_8y^8 + B_{10}y^{10} + \dots$$

3. When X=x/f, Y=y/f, C=fc, $\alpha 4 = f^3 B_4$, $\alpha 6 = f^5 B_6$, $\alpha 8 = f^7 B_8$, $\alpha 10 = f^9 B_{10}$, to obtain f=1.0, $$X = CY^2/\{1+[c^2y^2]^{1/2}\} + \alpha 4 Y^4 + \alpha 6 Y^6 + \alpha 8 Y^8 + \alpha 10 Y^{10} + \dots$$

4. When $\Phi = 8$ (N'-N) $\alpha 4$ (where the term |N'-N| is the difference between the refractive index of the lens and the refractive index of air), and the third-order aberration factors are represented by:

I: spherical aberration factor

II: coma factor

III: astigmatism factor

IV: sagittal field curvature factor

V: distortion factor, the influence on the fourth-order aspherical surface term ($\alpha 4$) in each aberration factor is given by;

$\Delta I = h^4 \Phi$ $\Delta II = h^3 k \Phi$ $\Delta III = h^2 k^2 \Phi$ $\Delta IV = h^2 k^2 \Phi$ $\Delta V = h k^3 \Phi$ Wherein h represents the height of paraxial ray (i.e. paraxial distance), k represents the height of non-paraxial ray passing through a center of a pupil.

Formula (8) is related to the front lens group. In case of an LED which emits monochromic light, if the value of Np is below the limit, the Petzval sum is too large to correct the distortion.

In case of illuminating light having a high monochromaticity, it is theoretically possible to use an optical glass having a small Abbe number. Nevertheless, in general, monochromatic light emitted by an LED has a wavelength band (fluctuation) of around ±10 nm with respect to a reference wavelength. Accordingly it is preferable that the optical glass to be used has a large Abbe number (low dispersibility) above the limit in formula (9).

Formulae (10), (11) and (12) are related to the front lens group (positive lens and negative lens) when the illuminating light is white light having a wavelength band of about ±100 nm with respect to a reference wavelength. If the value of $N_p$ is below the limit in formula (11), the Petzval sum is too large. If the value of $N_N$ is below the limit, it is difficult to correct the astigmatism and the distortion. If the value of ($v_P - v_N$) is below the limit in formula (12), no correction of the chromatic aberration can be accomplished.

If an LED which emits illuminating light having an intermediate wavelength of about ±30 nm with respect to a reference wavelength between monochromic light and white light is used, there are two lenses located before and after the diaphragm, respectively. To correct the transverse chromatic aberration of about ±30 nm (which is somewhat larger than light which could be considered mono chromatic light), it is necessary to satisfy the requirements defined in formulae (1), (2), (5a), (13) and (14).

Formula (1) specifies that the rear lens group has a small power and the front lens group has a positive large power. Consequently, the front lens group must be made of a glass lens which has a large Abbe number (low dispersibility) so as to satisfy the requirement defined in formula (13) to thereby restrict the transverse chromatic aberration.

The rear lens group is made of a meniscus lens with a concave surface facing the diaphragm so as to satisfy the requirements defined in formulae (1), (2) and (5a). Moreover, the meniscus lens is made of material having a high dispersibility (small Abbe number) so as to satisfy the requirement defined in formula (14), so that the transverse chromatic aberration caused in the front lens group can be easily corrected by a simple lens arrangement.

If the lens system satisfies the requirements specified in formulae (1) and (2), the first surface of the rear lens group has a large negative surface power and the second surface thereof has a large positive power whose absolute value is substantially the same as the surface power of the first surface. Moreover, the thickness of the rear lens group is large enough to satisfy the requirement defined by formula (5a), so that the first and second surfaces are spaced from one another.

In view of the requirements defined in formulae (1), (2) and (5a) and the position of the diaphragm, the incident angle (angle with respect to the normal line to the surface) of the off-axis rays incident upon the first surface of the rear lens group is increased. Furthermore, in view of the refraction of the first surface and the position of the second surface, the incident angle of the off-axis rays incident upon the second surface of the rear lens group is reduced. Consequently, the second surface refracts the incident light thereupon at an angle larger than the light incident upon the first surface owing to the difference in the incident angles. Moreover, since the first surface of the rear lens group is located on the side opposite to the front lens group with respect to the diaphragm, the transverse chromatic aberration caused by the second surface of the front lens group can be effectively corrected by the first surface of the second lens group. If the rear lens group is made of material having a high dispersibility (small Abbe number) contrary to the front lens group so as to satisfy the requirement defined in formula (14), the correction effect of the transverse chromatic aberration can be enhanced.

If the image forming lens system satisfies formulae (1), (2) and (5a), it spontaneously satisfies formulae (15) and (16).

(15) $0 < S_{R-1}/r_{R-1} < 0.3$

(16) $0.4 < (S_{R-1} + d_R)/-r_{R-2} < 1.0$ wherein $S_{R-1}$: the distance of the first surface of the rear lens group from the diaphragm, $S_{R-1} + d_R$: the distance of the second surface of the rear lens group from the diaphragm, $r_{R-1}$: radius of curvature of the first surface of the rear lens group, $r_{R-2}$: radius of curvature of the second surface of the rear lens group.

Formulae (15) and (16) represent that the incident angle (angle with respect to the normal line to the surface) of off-axis light upon the first surface of the rear lens group is large and the incident angle thereof upon the second surface of the rear lens group is small, respectively.

Note that the front lens group having a large power can be made only as a spherical lens of an optical glass to reduce the manufacturing cost.

The following discussion will be directed to a second aspect of the present invention. The elements corresponding to those in the formulae in the first aspect of the invention mentioned above are designated with the same symbols as those in the first aspect. If the requirements specified in the formulae in the second aspect are different in the range (upper and/or lower limits) from those in the first aspect, the symbols are designated with suffixes. The formulae in the second aspect of the invention will be discussed again below.

According to another aspect of the present invention, there is provided an image forming lens system comprising a positive front lens group, a diaphragm, and a rear lens group, in this order from an object to be imaged. The front lens group is provided with at least one aspherical surface, the rear lens group is comprised of one plastic lens having opposed aspheric surfaces, and wherein the following relationships are satisfied:

(1) $f_0 \cdot |1/f_{R-1} + 1/f_{R-2}| < 0.3$
(17) $1.5 < n_P < 1.7$
(18) $\Delta X_F/f_F < 0$
(3) $\Delta X_{R-1}/f_0 < 0$
(4) $\Delta X_{R-2}/f_0 < 0$ wherein $f_0$: focal length of the whole lens system;

$f_{R-1}(=r_{R-1}/n-1)$: focal length of the first surface of the plastic lens;

$f_{R-2}(=r_{R-2}/1-n)$: focal length of the second surface of the plastic lens;

n: refractive index of the plastic lens at a reference wavelength;

$r_{R-1}$: radius of curvature of the first surface of the plastic lens;

$r_{R-2}$: radius of curvature of the second surface of the plastic lens;

$n_P$: refractive index of the positive lens of the front lens group at a reference wavelength;

$\Delta X_F$: amount of aspheric deviation of the aspherical surface of the front lens group at an effective radius thereof;

$f_F$: focal length of the aspherical surface of the front lens group;

$\Delta X_{R-1}$: amount of aspheric deviation of the first surface of the plastic lens at an effective radius thereof;

$\Delta X_{R-2}$: amount of aspheric deviation of the second surface of the plastic lens at an effective radius thereof;

Preferably, the positive front lens group is made of one aspherical lens of optical glass or a composite of a single aspherical lens of optical glass and a resin layer coated thereon. In either case, the positive front lens group preferably satisfies the following relationship:

(19) $-30 < \Delta I_F < 0$ wherein $\Delta I_F$: aberration factor of the aspherical surface term of the spherical aberration factor of the aspherical surface of the front lens group.

In a preferred embodiment, the aspheric surface of the plastic lens of the rear lens group satisfies the following relationship:

(6b) $-20 < \Delta I_{R-1} < 0$ (7b) $0.5 < \Delta III_{R-2} < 2.0$ wherein $\Delta I_{R-1}$: aberration factor of the aspherical surface term of the spherical aberration factor of the first lens surface of the plastic lens;

$\Delta III_{R-2}$: aberration factor of the aspherical surface term of the astigmatism factor of the second lens surface of the plastic lens;

preferably, the Abbe number of the positive front lens group at the d-line is defined by;

(9b) $50 < v_P$ wherein $v_P$: Abbe number of the positive lens of the front lens group at the d-line.

If illuminating light is white light having a wavelength fluctuation of about ±100 nm with respect to a reference wavelength, the positive front lens group can be comprised of an achromatic lens consisting of a positive lens and a negative lens. In this case, the achromatic lens preferably satisfies the requirements defined by formula (9b) mentioned above and the following formula (12b):

(12b) $15 < v_P - v_N$ wherein $v_N$: Abbe number of the negative lens of the front lens group at the d-line.

As mentioned above, the front lens group can be made of one aspherical optical glass or one composite aspherical lens. The aspherical surface can be located either on the diaphragm side or on the object side to correct the aberration. Nevertheless, it is preferable that the concave surface of the front lens group adjacent to the diaphragm is formed as an aspherical surface, since the variation of the spherical aberration due to the second-order or fourth-order errors in the aspherical shape is restricted. In this case, the aspherical surface (concave surface) of the lens that is located adjacent to the diaphragm satisfies the following relationship:

(20) $-30 < \Delta I_F < -5$

If the front lens group is provided with an aspherical convex surface located adjacent to an object to be imaged, the front lens group satisfies the following relationship:

(21) $-5 < \Delta I_F < 0$

In the image forming lens system in which a diaphragm is provided between the front lens group and the rear lens group, according to the second aspect of the invention, as summarized above, the front lens group having a large power is made of an aspherical optical glass, and the rear lens group having a small power is made of a plastic aspherical lens whose opposed surfaces are both aspherical surfaces to reduce the manufacturing cost. Thus, the astigmatism or distortion, etc., can be effectively compensated by a reduced number of lens elements.

Formula (1) specifies the power of the rear plastic lens group. In general, since a coefficient of linear expansion or refractive index of a plastic lens tends to vary more due to the change in the temperature or moisture in comparison with an optical glass, it is necessary to decrease the power of the plastic lens. If the value of formula (1) exceeds the upper limit, the sum of the surface powers of the plastic lens is so large that there is a large deviation of the focal point due to the change in the temperature or moisture, etc. Accordingly, the lens system cannot be properly used as a reading lens system in which the lens group is fixed after the adjustment thereof is completed.

Formula (17) specifies the refractive index of the positive lens of the front lens group. In the present invention, since the front lens group is comprised of an aspherical surface, the aberration correction can be executed by inexpensive glass having a low refractive index, as specified in formula (17).

If the value of Np is below the lower limit, the Petzval sum is too large to correct the curvature of the field. Conversely, if the refractive index is above the upper limit, the glass is so expensive that no reduction of the manufacturing cost can be expected.

Formula (18) is related to the aspheric surface of the front lens group. In the case where the aspheric surface is provided on the concave surface adjacent to the diaphragm ($f_F<0$), the amount of aspheric deviation is a negative value, and in the case where the aspheric surface is provided on the convex surface adjacent to the object ($f_F>0$), the amount of aspheric deviation is a positive value, respectively. Namely, the spherical aberration can be effectively corrected by the divergent aspherical surface. To correct the spherical aberration, only the first surface of the rear lens group can be an aspherical surface. Nevertheless, if both the surface of the front lens group that is located adjacent to the diaphragm and the surface of the rear lens group that is located adjacent to the diaphragm are aspherical surfaces, the aspherical surface of the rear lens group contributes not only to a correction of the spherical aberration (to reduce the burden on the aspherical surface of the front lens group), but also to a correction of other aberrations.

Formula (3) is related to the first aspherical surface (adjacent to the diaphragm) of the plastic rear lens group. The spherical aberration, coma and astigmatism caused in the positive front lens group can be effectively corrected by the negative value of the aspherical deviation.

Formula (4) is related to the second aspherical surface of the plastic rear lens group. The astigmatism and distortion caused in the positive front lens group and the first surface of the plastic lens can be effectively corrected by the negative value of the aspherical deviation.

Formula (19) specifies the aspheric surface of the front lens group which is made of a single lens or a single composite aspherical lens to supplement the formula (18). If the value of formula (19) exceeds the upper limit, effective correction of the spherical aberration cannot be ensured. Conversely, if the value of formula (19) is below the lower limit, an over correction of the spherical aberration takes place, thus resulting in an occurrence of a high-order aberration.

Formulae (6b) and (7b) specify the aspheric surface of the rear lens group to supplement formulae (3) and (4). If the value of formula (6b) exceeds the upper limit, no effective correction of the spherical aberration can be ensured, or a high-order aberration can be caused due to an increase in the burden of the aspherical surface of the front lens group. Conversely, if the value of formula (6b) is below the lower limit, an over correction of the spherical aberration, coma and astigmatism takes place.

If the value of formula (7b) is below the lower limit, no effective correction of the astigmatism and coma can be ensured. Conversely, if the value of formula (7b) is above the upper limit, there is a large variation of the astigmatism within a range from an intermediate angle of view to the maximum angle of view.

Formula (9b) relates to the front lens group. If the illuminating light is perfect monochromatic light, no achromatization by the two positive and negative lenses is necessary. However, in practice, the wavelength of the monochromatic light emitted by an LED fluctuates within ±10 nm. Accordingly, it is advisable to use an optical glass whose Abbe number is above the lower limit defined in formula (9b) (i.e., optical glass having a low dispersibility).

If the illuminating light is white light having a reference wavelength within a range of ±100 nm, it is preferable that the positive and negative lenses of the front lens group satisfy the requirements defined in formula (12b) to correct the chromatic aberration. If the value of formula (12b) is below the lower limit, no correction of the chromatic aberration can be effected. Note that the amount of aspherical deviation at the height of the on-axis marginal rays when the front lens group is provided on the surface thereof adjacent to the diaphragm with an aspherical surface is larger than that when the front lens group is provided on the surface thereof adjacent to the object with an aspherical surface. Consequently, formula (20) can be preferably applied to the front lens group which is provided on the surface thereof adjacent to the diaphragm with the aspherical surface; and formula (21) can be preferably applied to the front lens group which is provided on the surface thereof adjacent to the object with the aspherical surface, respectively.

The present disclosure relates to subject matter contained in Japanese patent application Nos. 5-270290 (filed on Oct. 28, 1993), 5-328865 (filed on Dec. 24, 1993), 6-78504 (filed on Apr. 18, 1994) and 6-171240 (filed on Jul. 22, 1994) which are expressly incorporated herein by reference in their entirety.

BRIEF DESCRIPTION OF THE DRAWINGS

The invention will be described below in detail with reference to the accompanying drawings, in which;

FIG. 3 is a schematic view of a lens arrangement of an image forming lens system, according to a second embodiment of the present invention;

FIGS. 4A, 4B, 4C, 4D and 4E show various aberration diagrams of the lens system shown in FIG. 3;

FIG. 5 is a schematic view of a lens arrangement of an image forming lens system, according to a third embodiment of the present invention;

FIGS. 6A, 6B, 6C, 6D and 6E show various aberration diagrams of the lens system shown in FIG. 5;

FIG. 7 is a schematic view of a lens arrangement of an image forming lens system, according to a fourth embodiment of the present invention;

FIGS. 8A, 8B, 8C, 8D and 8E show various aberration diagrams of the lens system shown in FIG. 7;

FIG. 9 is a schematic view of a lens arrangement of an image forming lens system, according to a fifth embodiment of the present invention;

FIGS. 10A, 10B, 10C, 10D and 10E show various aberration diagrams of the lens system shown in FIG. 9;

FIG. 17 is a schematic view of a lens arrangement of an image forming lens system, according to a ninth embodiment of the present invention;

FIGS. 18A, 18B, 18C, 18D and 18E show various aberration diagrams of the lens system shown in FIG. 17;

FIG. 19 is a schematic view of a lens arrangement of an image forming lens system, according to a tenth embodiment of the present invention;

FIGS. 20A, 20B, 20C, 20D and 20E show various aberration diagrams of the lens system shown in FIG. 19;

FIG. 21 is a schematic view of a lens arrangement of an image forming lens system, according to an eleventh embodiment of the present invention;

FIGS. 22A, 22B, 22C, 22D and 22E show various aberration diagrams of the lens system shown in FIG. 21;

FIG. 29 is a schematic view of a lens arrangement of an image forming lens system, according to a fifteenth embodiment of the present invention;

FIGS. 30A, 30B, 30C, 30D and 30E show various aberration diagrams of the lens system shown in FIG. 29; and, FIG. 31 is an enlarged explanatory view of an aspheric lens to explain the amount of aspheric deviation.

DESCRIPTION OF THE PREFERRED EMBODIMENT

Concrete embodiments (15 numerical examples) will be discussed below. The first to ninth embodiments correspond to the first aspect of the invention and the tenth to fifteenth embodiments correspond to the second aspect of the invention respectively.

First Embodiment

Figure 1:
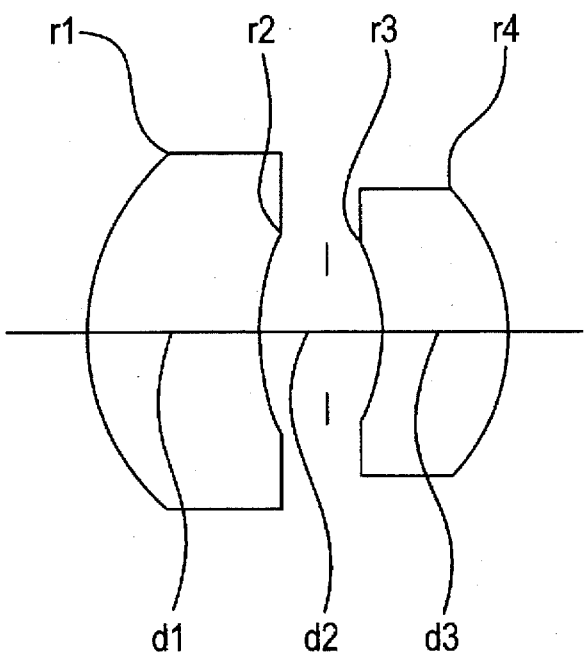
FIG. 1 is a schematic view of a lens arrangement of an image forming lens system, according to a first embodiment of the present invention.
Figures 2A, 2B, 2C, 2D, 2E:
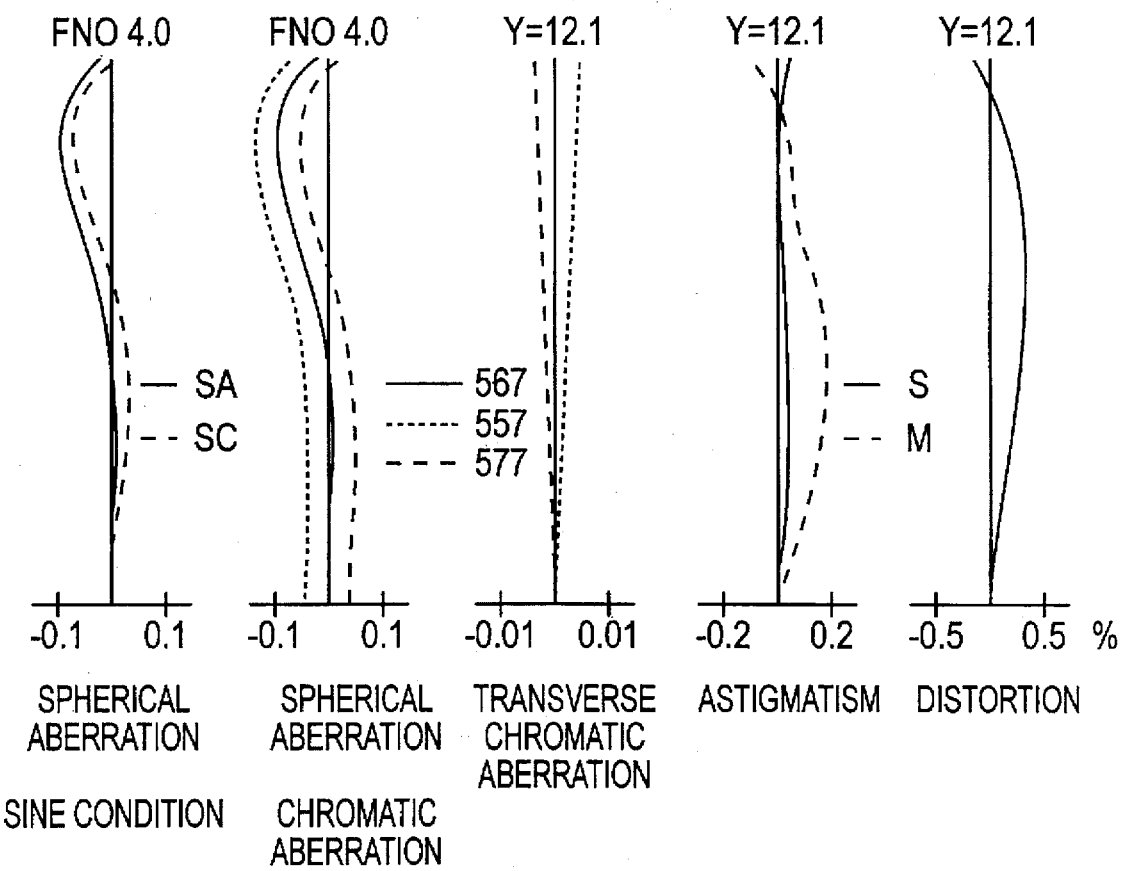
FIGS. 2A, 2B, 2C, 2D and 2E show various aberration diagrams of the lens system shown in FIG. 1.

FIG. 1 shows a lens arrangement of an image forming lens system including a single positive meniscus lens, a diaphragm, and a single plastic negative meniscus lens, arranged in this order from the object to be imaged according to a first embodiment of the present invention.

Numerical data of the lens system shown in FIG. 1 is shown in Table 1 below. Diagrams of various aberrations thereof are shown in FIGS. 2A–2E.

In FIGS. 2A–2E, "SA" represents the spherical aberration, "SC" the sine condition, numerals such as "567" and "d-line", "g-line", "c-line", "F-line", and "e-line" the chromatic aberration represented by the spherical aberration, and the transverse chromatic aberration, at the respective wavelengths (nm), "S" the sagittal ray, and "M" the meridional ray, respectively.

In the tables and the drawings, "$F_{NO}$" represents the f-number, "f" the focal length, "M" the lateral magnification, "Y" the image height, "fB" the back focal distance, respectively. Also, "R" represents the radius of curvature, "D" the lens thicknesses or the distance between the lenses, "$N_{(567\ nm)}$" the refractive index at the reference wavelength of 567 nm (LED serving as an illuminating light source), "$N_d$" the refractive index at the d-line, and "$\nu$" the Abbe number, respectively.

TABLE 1

$F_{NO} = 4$
$f = 24.88$
$M = -0.112$
$Y = 12.1$
$f_B = 14.11$

| surface NO | R | d | $N_{(567\ nm)}$ | $N_d$ | $\nu_d$ |
|---|---|---|---|---|---|
| 1 | 7.500 | 5.39 | 1.77424 | 1.77250 | 49.6 |
| 2 | 8.250 | 2.10 | — | — | — |
| STOP | ∞ | 1.76 | — | — | — |
| 3* | -8.736 | 4.00 | 1.49271 | 1.49176 | 57.4 |
| 4* | -8.000 | — | | (plastic lens) | |

*marked surface is aspherical.
NO. 3: $=0.0, A4 = -0.22977 \times 10^{-2}, A6 = 0.10043 \times 10^{-3}, A8 = -0.38115 \times 10^{-4}$,
$A10 = 0.98130 \times 10^{-6}, A12 = 0.0$ amount of aspheric deviation; $\Delta X = -0.1714$ paraxial distance; $h = 2.70$
NO. 4: $K = 0.0, A4 = -0.45972 \times 10^{-3}, A6 = -0.38027 \times 10^{-4}, A8 = 0.18910 \times 10^{-5}, A10 = -0.89392 \times 10^{-7}, A12 = 0.0$ amount of aspheric deviation; $\Delta X = -0.5225$ paraxial distance; $h = 4.54$ The shape of the aspherical surface can be generally expressed as follows.

$$X = CY^2/\{1+[1-(1+K)C^2Y^2]^{1/2}\} + A_4Y^4 + A_5Y^6 + A_8Y^8 + A_{10}Y^{10} + \ldots$$

wherein,

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents an eighth-order aspherical factor, $A_{10}$ represents a tenth-order aspherical factor.

$A_{12}$ represents a twelfth-order aspherical factor.

Second Embodiment

FIG. 3 shows a lens arrangement of an image forming lens system including a single positive meniscus lens, a diaphragm, and a single plastic negative meniscus lens, arranged in this order from the object to be imaged, according to a second embodiment of the present invention.

Numerical data of the lens system shown in FIG. 3 is shown in Table 2 below. Diagrams of various aberrations thereof are shown in FIGS. 4A–4E, respectively.

TABLE 2

$F_{NO} = 4$
$f = 24.80$
$M = -0.112$
$Y = 12.1$
$f_B = 14.68$

| surface NO | R | d | $N_{(567\ nm)}$ | $N_d$ | $\nu_d$ |
|---|---|---|---|---|---|
| 1 | 7.241 | 4.74 | 1.77424 | 1.77250 | 49.6 |
| 2 | 8.081 | 1.29 | — | — | — |
| STOP | ∞ | 2.34 | — | — | — |
| 3* | -11.300 | 4.00 | 1.49271 | 1.49176 | 57.4 |

TABLE 2-continued

| | | | |
|---|---|---|---|
| 4* | −9.870 | — | (plastic lens) |

*marked surface is aspherical.
NO. 3: K = 0.0, A4 = −0.19229 × $10^{-2}$, A6 = 0.78033 × $10^{-5}$, A8 = −0.11225 × $10^{-4}$, A10 = −0.35179 × $10^{-6}$, A12 = 0.0 amount of aspheric deviation; ΔX = −0.2789 paraxial distance; h = 3.07
NO. 4: K = 0.0, A4 = −0.53073 × $10^{-3}$, A6 = −0.18526 × $10^{-4}$, A8 = 0.59975 × $10^{-6}$, A10 = −0.39638 × $10^{-7}$, A12 = 0.0 amount of aspheric deviation; ΔX = −0.6739 paraxial distance; h = 4.89

Third Embodiment

FIG. 5 shows a lens arrangement of an image forming lens system including a single positive meniscus lens, a diaphragm, and a single plastic negative meniscus lens, arranged in this order from the object to be imaged, according to a third embodiment of the present invention.

Numerical data of the lens system shown in FIG. 5 is shown in Table 3 below. Diagrams of various aberrations thereof are shown in FIGS. 6A–6E, respectively.

TABLE 3

$F_{NO} = 4$
f = 24.85
M = −0.112
Y = 12.1
$f_B$ = 11.94

| surface NO | R | d | $N_{(567\,nm)}$ | $N_d$ | $v_d$ |
|---|---|---|---|---|---|
| 1 | 7.700 | 5.48 | 1.77424 | 1.77250 | 49.6 |
| 2 | 9.930 | 2.31 | — | — | — |
| STOP | ∞ | 1.69 | — | — | — |
| 3* | −9.566 | 6.00 | 1.52736 | 1.52580 | 52.1 |
| 4* | −10.660 | — | (plastic lens) | | |

*marked surface is aspherical.
NO. 3: K = 0.0, A4 = −0.16336 × $10^{-2}$, A6 = 0.27433 × $10^{-5}$, A8 = −0.88188 × $10^{-5}$, A10 = −0.87781 × $10^{-7}$, A12 = 0.0 amount of aspheric deviation; ΔX = −0.1073 paraxial distance; h = 2.66
NO. 4: K = 0.0, A4 = −0.27818 × $10^{-3}$, A6 = −0.72086 × $10^{-5}$, A8 = 0.11812 × $10^{-6}$, A10 = −0.54586 × $10^{-8}$, A12 = 0.0 amount of aspheric deviation; ΔX = −0.4782 paraxial distance; h = 5.47

Fourth Embodiment

FIG. 7 shows a lens arrangement of an image forming lens system including a single positive meniscus lens, a diaphragm, and a single plastic negative meniscus lens, arranged in this order from the object to be imaged, according to a fourth embodiment of the present invention.

Numerical data of the lens system shown in FIG. 7 is shown in Table 4 below. Diagrams of various aberrations thereof are shown in FIGS. 8A–8E, respectively.

TABLE 4

$F_{NO} = 4$
f = 24.87
M = −0.112
Y = 12.1
$f_B$ = 12.02

| surface NO | R | d | $N_{(567\,nm)}$ | $N_d$ | $v_d$ |
|---|---|---|---|---|---|
| 1 | 7.640 | 5.40 | 1.77424 | 1.77250 | 49.6 |
| 2 | 9.800 | 2.14 | — | — | — |
| STOP | ∞ | 1.68 | — | — | — |
| 3* | −10.590 | 6.00 | 1.52736 | 1.52580 | 52.1 |
| 4* | −11.900 | — | (plastic lens) | | |

*marked surface is aspherical.
NO.3: K = 0.0, A4 = −0.16314 × $10^{-2}$, A6 = 0.15016 × $10^{-4}$, A8 = −0.10072 × $10^{-4}$, A10 = 0.46950 × $10^{-7}$, A12 = 0.0 amount of aspheric deviation; ΔX = −0.1061 paraxial distance; h = 2.69

TABLE 4-continued

NO.4: K = 0.0, A4 = −0.32588 × $10^{-3}$, A6 = −0.28234 × $10^{-5}$, A8 = −0.51896 × $10^{-7}$, A10 = −0.22355 × $10^{-8}$, A12 = 0.0 amount of aspheric deviation; ΔX = −0.4612 paraxial distance; h = 5.47

Fifth Embodiment

FIG. 9 shows a lens arrangement of an image forming lens system including a single positive meniscus lens, a diaphragm, and a single plastic negative meniscus lens, arranged in this order from the object to be imaged, according to a fifth embodiment of the present invention.

Numerical data of the lens system shown in FIG. 9 is shown in Table 5 below. Diagrams of various aberrations thereof are shown in FIGS. 10A–10E, respectively.

TABLE 5

$F_{NO} = 4$
f = 25.00
M = −0.112
Y = 12.1
$f_B$ = 11.75

| surface NO | R | d | $N_{(567\,nm)}$ | $N_d$ | $v_d$ |
|---|---|---|---|---|---|
| 1 | 8.081 | 5.14 | 1.85055 | 1.84666 | 23.8 |
| 2 | 10.248 | 2.68 | — | — | — |
| STOP | ∞ | 1.81 | — | — | — |
| 3* | −10.290 | 6.00 | 1.52736 | 1.52580 | 52.1 |
| 4* | −11.533 | — | (plastic lens) | | |

*marked surface is aspherical.
NO.3: K = 0.0, A4 = −0.14537 × $10^{-2}$, A6 = −0.12556 × $10^{-4}$, A8 = −0.51919 × $10^{-5}$, A10 = −0.10652 × $10^{-6}$, A12 = 0.0 amount of aspheric deviation; ΔX = −0.1082 paraxial distance; h = 2.75
NO.4: K = 0.0, A4 = −0.29892 × $10^{-3}$, A6 = −0.38902 × $10^{-5}$, A8 = 0.33424 × $10^{-8}$, A10 = −0.27291 × $10^{-8}$, A12 = 0.0 amount of aspheric deviation; ΔX = −0.4740 paraxial distance; h = 5.55

Sixth Embodiment

Figure 11:
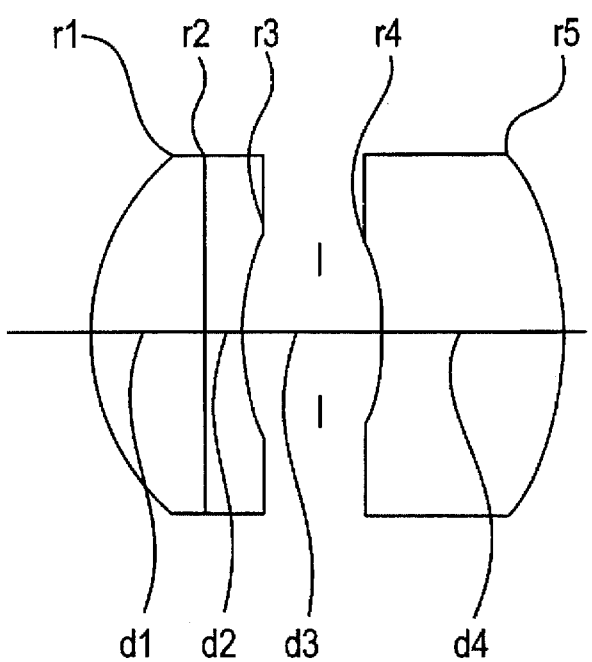
FIG. 11 is a schematic view of a lens arrangement of an image forming lens system, according to a sixth embodiment of the present invention.
Figures 12A, 12B, 12C, 12D, 12E:
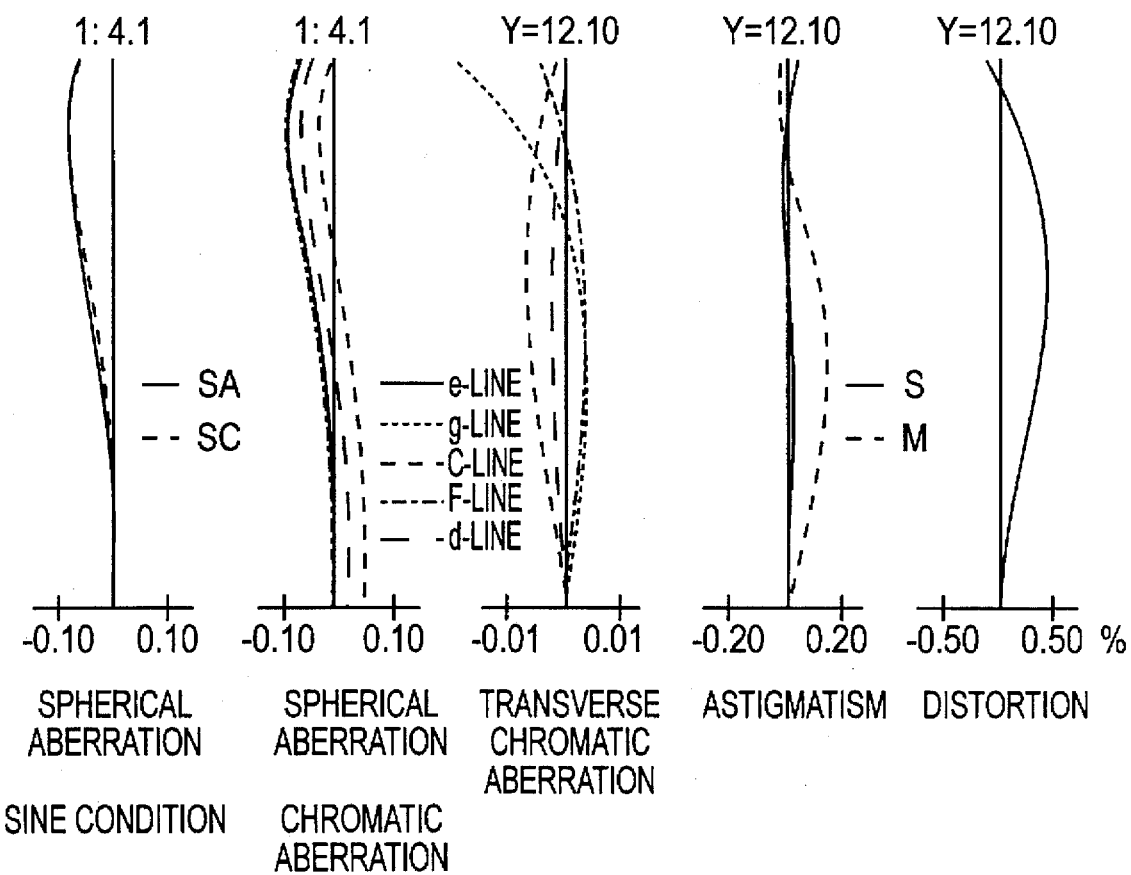
FIGS. 12A, 12B, 12C, 12D and 12E show various aberration diagrams of the lens system shown in FIG. 11.

FIG. 11 shows a lens arrangement of an image forming lens system including a positive cemented lens consisting of a positive lens and a negative lens, a diaphragm, and a single plastic negative meniscus lens, arranged in this order from the object to be imaged, according to a sixth embodiment of the present invention.

Numerical data of the lens system shown in FIG. 11 is shown in Table 6 below. Diagrams of various aberrations thereof are shown in FIGS. 12A–12E, respectively.

TABLE 6

$F_{NO} = 4.1$
f = 24.85
M = −0.112
Y = 12.1
$f_B$ = 12.06

| surface NO | R | d | $N_{(567\,nm)}$ | $N_d$ | $v_d$ |
|---|---|---|---|---|---|
| 1 | 7.710 | 3.46 | 1.83945 | 1.83481 | 42.7 |
| 2 | 717.040 | 1.20 | 1.81675 | 1.80834 | 22.6 |
| 3 | 9.523 | 2.48 | — | — | — |
| STOP | ∞ | 1.95 | — | — | — |
| 4* | −9.812 | 6.00 | 1.49379 | 1.49176 | 57.4 |
| 5* | −10.999 | — | (plastic lens) | | |

*marked surface is aspherical.
NO.4: K = 0.0, A4 = −0.16035 × $10^{-2}$, A6 = 0.12879 × $10^{-4}$, TABLE 6-continued $A8 = -0.93406 \times 10^{-5}$, $A10 = -0.53023 \times 10^{-7}$, $A12 = 0.0$
amount of aspheric deviation; $\Delta X = -0.1334$
paraxial distance; $h = 2.82$
NO.5: $K = 0.0$, $A4 = -0.23510 \times 10^{-3}$, $A6 = -0.10969 \times 10^{-4}$,
$A8 = 0.26850 \times 10^{-6}$, $A10 = -0.70363 \times 10^{-8}$, $A12 = 0.0$
amount of aspheric deviation; $\Delta X = -0.5122$
paraxial distance; $h = 5.58$ Seventh Embodiment FIG. 13 shows a lens arrangement of an image forming lens system including a positive cemented lens consisting of a positive lens and a negative lens, a diaphragm, and a single plastic negative meniscus lens, arranged in this order from the object to be imaged according to a seventh embodiment of the present invention.

Figure 13:
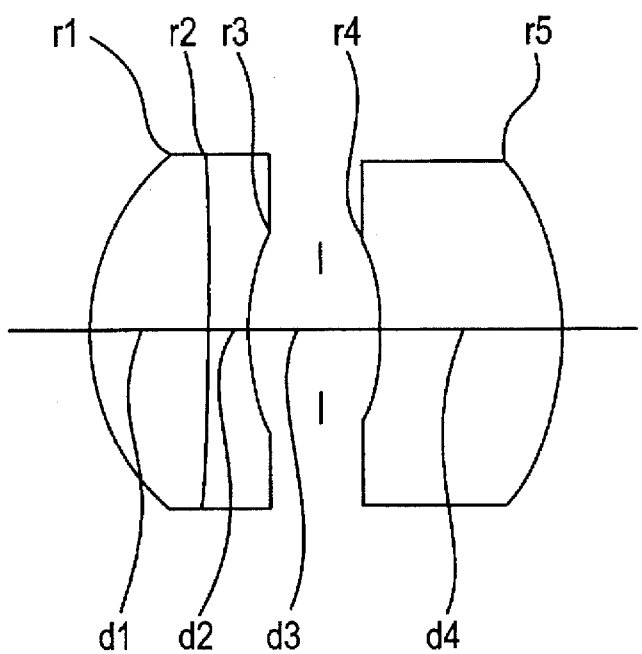
FIG. 13 is a schematic view of a lens arrangement of an image forming lens system, according to a seventh embodiment of the present invention.
Figures 14A, 14B, 14C, 14D, 14E:
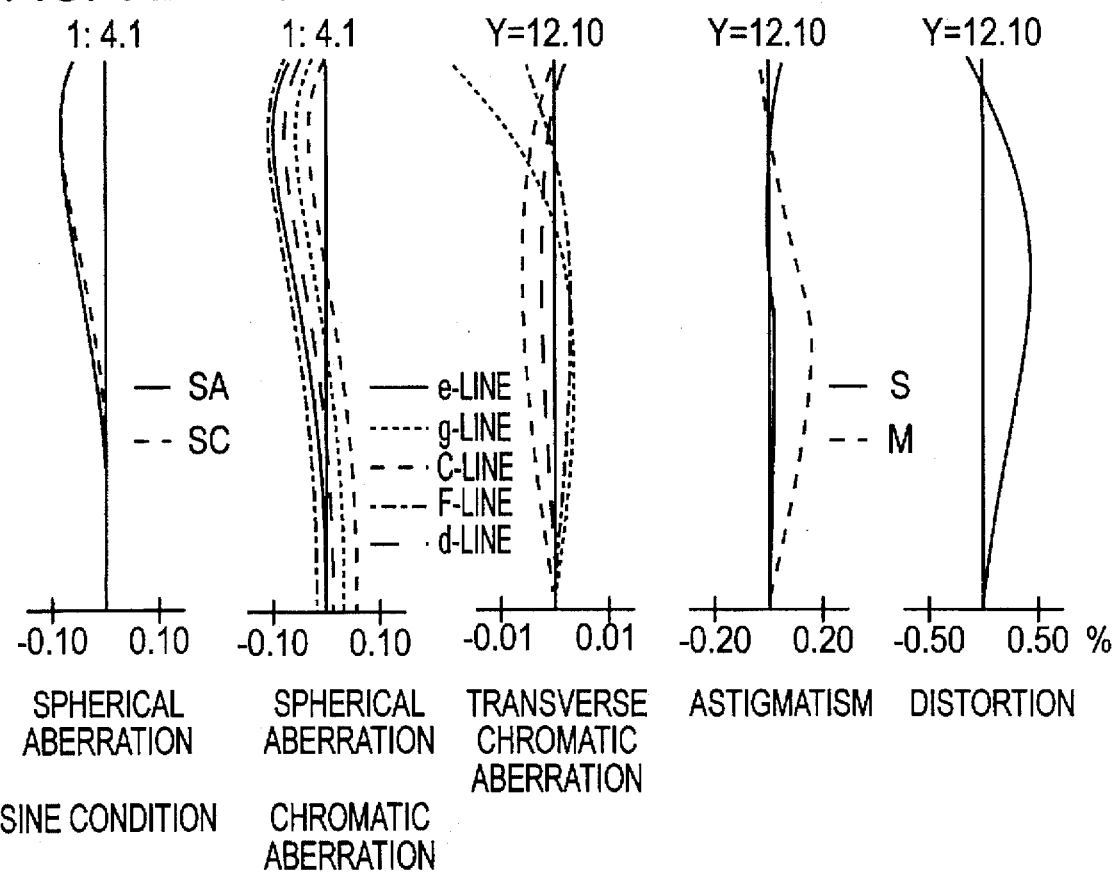
FIGS. 14A, 14B, 14C, 14D and 14E show various aberration diagrams of the lens system shown in FIG. 13.

Numerical data of the lens system shown in FIG. 13 is shown in Table 7 below. Diagrams of various aberrations thereof are shown in FIGS. 14A–14E, respectively.

TABLE 7

$F_{NO} = 4.1$
$f = 24.85$
$M = -0.112$
$Y = 12.1$
$f_B = 12.14$

| surface NO | R | d | $N_{(567\,nm)}$ | $N_d$ | $v_d$ |
|---|---|---|---|---|---|
| 1 | 7.590 | 3.63 | 1.80811 | 1.80400 | 46.6 |
| 2 | -102.101 | 1.20 | 1.79191 | 1.78472 | 25.7 |
| 3 | 9.469 | 2.32 | — | — | — |
| STOP | ∞ | 1.91 | — | — | — |
| 4* | -9.650 | 6.00 | 1.49379 | 1.49176 | 57.4 |
| 5* | -10.803 | — | (plastic lens) | | |

*marked surface is aspherical.
NO.4: $K = 0.0$, $A4 = -0.16731 \times 10^{-2}$, $A6 = 0.19844 \times 10^{-4}$,
$A8 = -0.11235 \times 10^{-4}$, $A10 = -0.19150 \times 10^{-7}$, $A12 = 0.0$
amount of aspheric deviation; $\Delta X = -0.1340$
paraxial distance; $h = 2.79$
NO.5: $K = 0.0$, $A4 = -0.23351 \times 10^{-3}$, $A6 = -0.11809 \times 10^{-4}$,
$A8 = 0.30162 \times 10^{-6}$, $A10 = -0.78834 \times 10^{-8}$, $A12 = 0.0$
amount of aspheric deviation; $\Delta X = -0.5176$
paraxial distance; $h = 5.56$ Eighth Embodiment FIG. 15 shows a lens arrangement of an image forming lens system including a single positive meniscus lens, a diaphragm, and a single plastic negative meniscus lens, arranged in this order from the object to be imaged, according to an eighth embodiment of the present invention.

Figure 15:
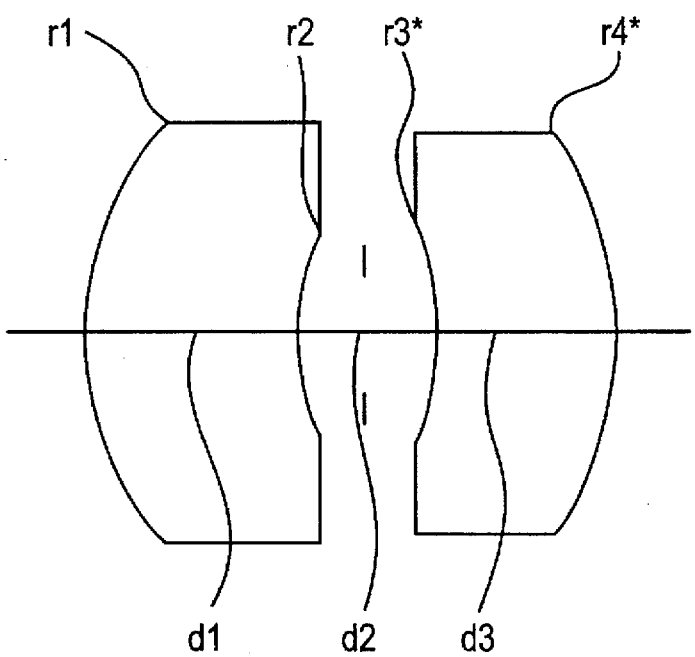
FIG. 15 is a schematic view of a lens arrangement of an image forming lens system, according to an eighth embodiment of the present invention.
Figures 16A, 16B, 16C, 16D, 16E:
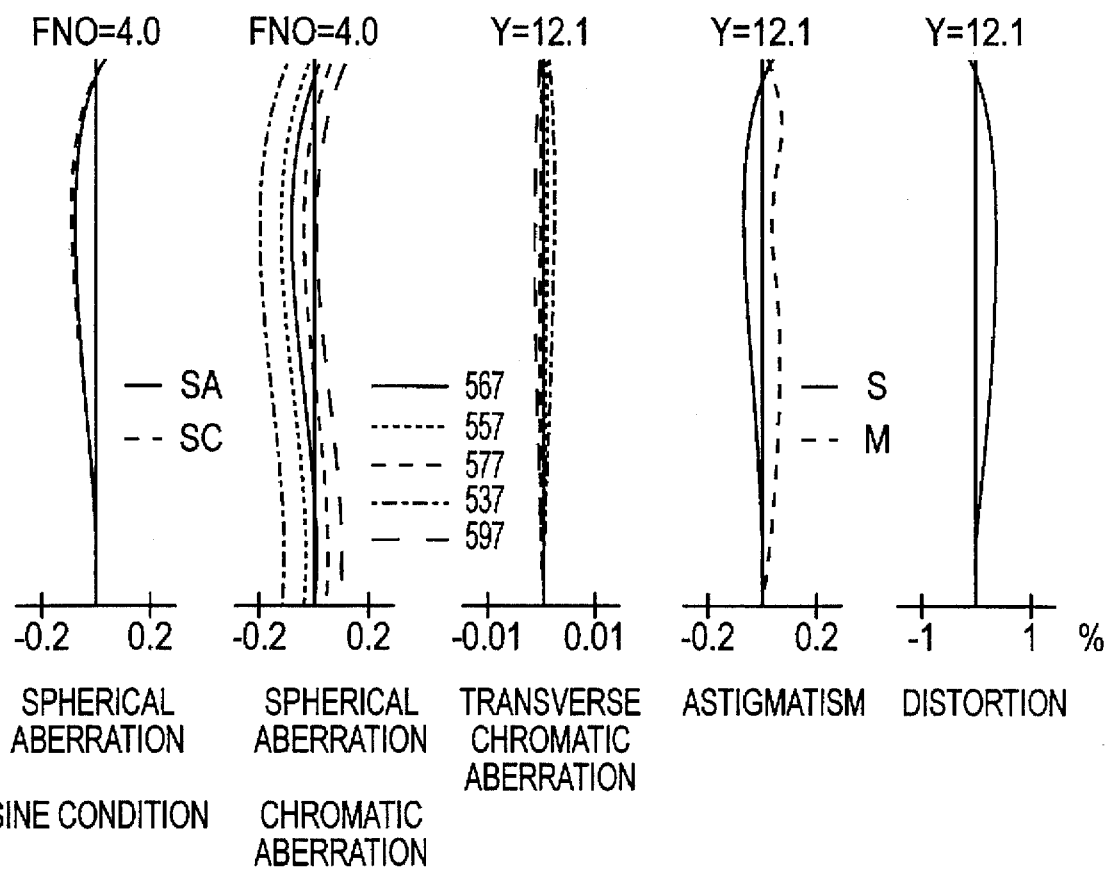
FIGS. 16A, 16B, 16C, 16D and 16E show various aberration diagrams of the lens system shown in FIG. 15.

Numerical data of the lens system shown in FIG. 15 is shown in Table 8 below. Diagrams of various aberrations thereof are shown in FIGS. 16A–16E, respectively.

TABLE 8

$F_{NO} = 4$
$f = 24.81$
$M = -0.113$
$Y = 12.1$
$f_B = 15.40$

| surface NO | R | d | $N_{(567nm)}$ | $N_d$ | $v_d$ |
|---|---|---|---|---|---|
| 1 | 7.400 | 5.40 | 1.73065 | 1.72916 | 54.7 |
| 2 | 8.930 | 1.55 | — | — | — |
| STOP | ∞ | 1.90 | — | — | — |
| 3 * | -11.000 | 4.74 | 1.58761 | 1.58547 | 29.9 |
| 4 * | -10.900 | — | (plastic lens) | — | |

TABLE 8-continued

* marked surface is aspherical.
NO. 3: $K = 0.33000$, $A4 = -0.13900 \times 10^{-2}$, $A6 = -0.61900 \times 10^{-4}$, $A8 = 0.23200 \times 10^{-5}$, $A10 = -0.99300 \times 10^{-6}$, $A12 = 0.0$ amount of aspheric deviation; $\Delta X = -0.1521$ paraxial distance; $h = 2.85$
NO. 4: $K = -0.65000$, $A4 = -0.39100 \times 10^{-3}$, $A6 = -0.15700 \times 10^{-4}$ $A8 = 0.49300 \times 10^{-6}$, $A10 = -0.18000 \times 10^{-7}$, $A12 = 0.0$ amount of aspheric deviation; $\Delta X = -0.4526$ paraxial distance; $h = 5.05$ Ninth Embodiment FIG. 17 shows a lens arrangement of an image forming lens system including a single positive meniscus lens, a diaphragm, and a single plastic negative meniscus lens, arranged in this order from the object to be imaged, according to an ninth embodiment of the present invention.

Numerical data of the lens system shown in FIG. 17 is shown in Table 9 below. Diagrams of various aberrations thereof are shown in FIGS. 18A–18E, respectively.

TABLE 9

$F_{NO} = 5.6$
$f = 24.81$
$M = -0.112$
$Y = 12.1$
$f_B = 16.28$

| surface NO | R | d | $N_{(567\,nm)}$ | $N_d$ | $v_d$ |
|---|---|---|---|---|---|
| 1 | 7.118 | 4.69 | 1.73065 | 1.72916 | 54.7 |
| 2 | 8.710 | 2.36 | — | — | — |
| STOP | ∞ | 1.59 | — | — | — |
| 3 * | -8.750 | 3.79 | 1.58761 | 1.58547 | 29.9 |
| 4 * | -9.000 | — | (plastic lens) | | |

* marked surface is aspherical.
NO. 3: $K = 0.0$, $A4 = -0.16800 \times 10^{-2}$, $A6 = -0.78000 \times 10^{-4}$, $A8 = 0.33500 \times 10^{-5}$, $A10 = -0.15200 \times 10^{-5}$, $A12 = 0.0$ amount of aspheric deviation; $\Delta X = -0.0798$ paraxial distance; $h = 2.42$
NO.4: $K = -0.65000$, $A4 = -0.53500 \times 10^{-3}$, $A6 = -0.29200 \times 10^{-4}$, $A8 = 0.12200 \times 10^{-6}$, $A10 = -0.53500 \times 10^{-7}$, $A12 = 0.0$ amount of aspheric deviation; $\Delta X = -0.3195$ paraxial distance; $h = 4.36$ Values of the above-mentioned formulae in the first to ninth embodiments are shown in Table 10 below. Note that values in formula (1) below are not absolute values,

TABLE 10

| | Embodiment | | | | |
|---|---|---|---|---|---|
| | 1 | 2 | 3 | 4 | 5 |
| formula (1) | 0.129 | 0.157 | -0.141 | -0.136 | -0.138 |
| formula (2) | -2.85 | -2.19 | -2.60 | -2.35 | -2.43 |
| formula (3) | -0.0069 | -0.0112 | -0.0043 | -0.0043 | -0.0043 |
| formula (4) | -0.0210 | -0.0272 | -0.0192 | -0.0185 | -0.0190 |
| formula (5a) (5b) | 0.16 | 0.16 | 0.24 | 0.24 | 0.24 |
| formula (6) | -12.6 | -13.9 | -7.4 | -8.0 | -6.5 |
| formula (7) | 0.81 | 1.07 | 0.68 | 0.76 | 0.72 |
| formula (8) | 1.774 | 1.774 | 1.774 | 1.774 | 1.85 |
| formula (9) | 49.6 | 49.6 | 49.6 | 49.6 | 23.8 |
| formula (10) | — | — | — | — | — |
| formula (11) | — | — | — | — | — |
| formula (12) | — | — | — | — | — |

| | Embodiment | | | |
|---|---|---|---|---|
| | 6 | 7 | 8 | 9 |
| formula (1) | -0.135 | -0.136 | 0.012 | -0.047 |
| formula (2) | -2.53 | -2.58 | -2.26 | -2.84 |
| formula (3) | -0.0054 | -0.0054 | -0.0061 | -0.0032 |
| formula (4) | -0.0206 | -0.0208 | -0.0182 | -0.0129 |
| formula (5a) (5b) | 0.24 | 0.24 | 0.19 | 0.15 |
| formula (6) | -7.6 | -8.0 | -9.92 | -12.3 |
| formula (7) | 0.57 | 0.56 | 0.77 | 0.74 |

TABLE 10-continued

| | | | | |
|---|---|---|---|---|
| formula (8) | — | — | 1.73 | 1.73 |
| formula (9) | — | — | — | — |
| formula (10) | 1.839 | 1.808 | — | — |
| formula (11) | 1.817 | 1.792 | — | — |
| formula (12) | 20.1 | 20.9 | — | — |
| formula (13) | — | — | 54.7 | 54.7 |
| formula (14) | — | — | 29.9 | 29.9 |
| formula (15) | — | — | 0.173 | 0.182 |
| formula (16) | — | — | 0.609 | 0.598 |

As can be seen from Table 10 above, all nine embodiments satisfy the requirements defined in formulae (1) through (5a), and (5b), (6) and (7). Moreover, the 1st to 4th embodiments satisfy the requirements defined by formulae (8) and (9). The 5th embodiment satisfies the requirements defined by formula (8). The 6th and 7th embodiments satisfy the requirements defined by formulae (10), (11) and (12). The 8th and 9th embodiments satisfy the requirements defined by formulae (13) through (16). The image forming lens system according to the present invention has a smaller number of components (lenses) including at least one plastic lens which can effectively correct the various aberrations.

As can be understood from the above discussion, according to the first aspect of the present invention, since the number of the lenses is reduced and the lens arrangement is partly comprised of a plastic lens, the manufacturing cost can be reduced. In addition to the foregoing, a lens system obtained by the present invention has a half-angle of view of about 23° through 27°, particularly at an f-number of 4 through 5.6 and can be advantageously used for an optical reader in a facsimile machine.

The tenth through fifteenth embodiments corresponding to the second aspect of the present invention will be discussed below.

Tenth Embodiment

FIG. 19 shows a lens arrangement of an image forming lens system including a single positive meniscus lens, a diaphragm, and a single plastic negative meniscus lens, arranged in this order from the object to be imaged, according to a tenth embodiment of the present invention. The front lens group is provided on the surface thereof adjacent to the diaphragm with an aspherical surface.

Numerical data of the lens system shown in FIG. 19 is shown in Table 11 below. Diagrams of various aberrations thereof are shown in FIGS. 20A–20E respectively.

TABLE 11

$F_{NO} = 4$
$f = 25.07$
$M = -0.112$
$Y = 12.0$
$f_B = 8.02$

| surface NO | R | d | $N_{(567\,nm)}$ | $N_d$ | $v_d$ |
|---|---|---|---|---|---|
| 1 | 4.963 | 4.07 | 1.51723 | 1.51633 | 64.1 |
| 2* | 5.282 | 1.61 | — | — | — |
| STOP | ∞ | 3.34 | — | — | — |
| 3* | 18.556 | 4.50 | 1.49271 | 1.49176 | 57.4 |
| 4* | 23.621 | — | | | |

*marked surface is aspherical.
NO.2: $K = 0.0$, $A4 = 0.13523 \times 10^{-2}$, $A6 = 0.71039 \times 10^{-4}$,
$A8 = 0.12325 \times 10^{-4}$, $A10 = 0.0$, $A12 = 0.0$
NO.3: $K = 0.0$, $A4 = -0.84677 \times 10^{-3}$, $A6 = 0.58534 \times 10^{-4}$,
$A8 = -0.20055 \times 10^{-5}$, $A10 = 0.30922 \times 10^{-7}$, $A12 = 0.0$
NO.4: $K = 0.0$, $A4 = -0.62267 \times 10^{-3}$, $A6 = 0.14538 \times 10^{-4}$,
$A8 = -0.21979 \times 10^{-6}$, $A10 = 0.20607 \times 10^{-8}$, $A12 = 0.0$
amount of aspheric deviation; $\Delta X_F = 0.1217$
paraxial distance; $h = 2.65$ TABLE 11-continued amount of aspheric deviation; $\Delta X_{R-1} = -0.0913$
paraxial distance; $h = 4.43$
amount of aspheric deviation; $\Delta X_{R-2} = -0.3216$
paraxial distance; $h = 5.65$ Eleventh Embodiment FIG. 21 shows a lens arrangement of an image forming lens system including a single positive meniscus lens, a diaphragm, and a single plastic negative meniscus lens, arranged in this order from the object to be imaged, according to an eleventh embodiment of the present invention. The front lens group is provided on the surface thereof adjacent to the diaphragm with an aspherical surface.

Numerical data of the lens system shown in FIG. 21 is shown in Table 12 below. Diagrams of various aberrations thereof are shown in FIGS. 22A–22E, respectively.

TABLE 12

$F_{NO} = 4$
$f = 25.07$
$M = -0.112$
$Y = 12.0$
$f_B = 9.03$

| surface NO | R | d | $N_{(567\,nm)}$ | $N_d$ | $v_d$ |
|---|---|---|---|---|---|
| 1 | 5.511 | 4.70 | 1.59021 | 1.58913 | 61.2 |
| 2* | 5.823 | 1.54 | — | — | — |
| STOP | ∞ | 2.22 | — | — | — |
| 3* | -247.913 | 3.81 | 1.49271 | 1.49176 | 57.4 |
| 4* | -70.093 | — | | | |

Figure 23:
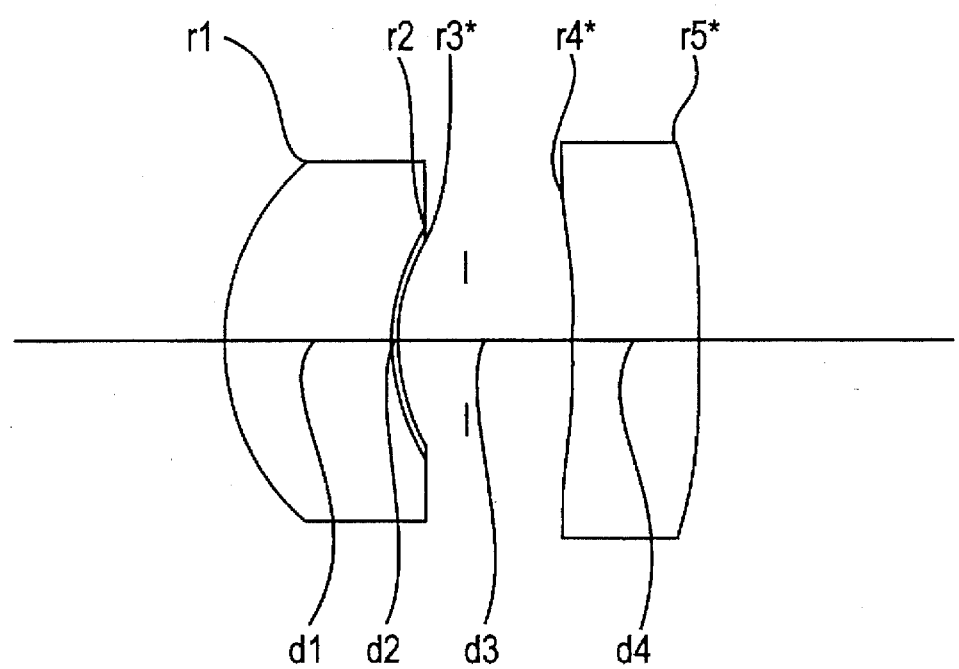
FIG. 23 is a schematic view of a lens arrangement of an image forming lens system, according to a twelfth embodiment of the present invention.
Figures 24A, 24B, 24C, 24D, 24E:
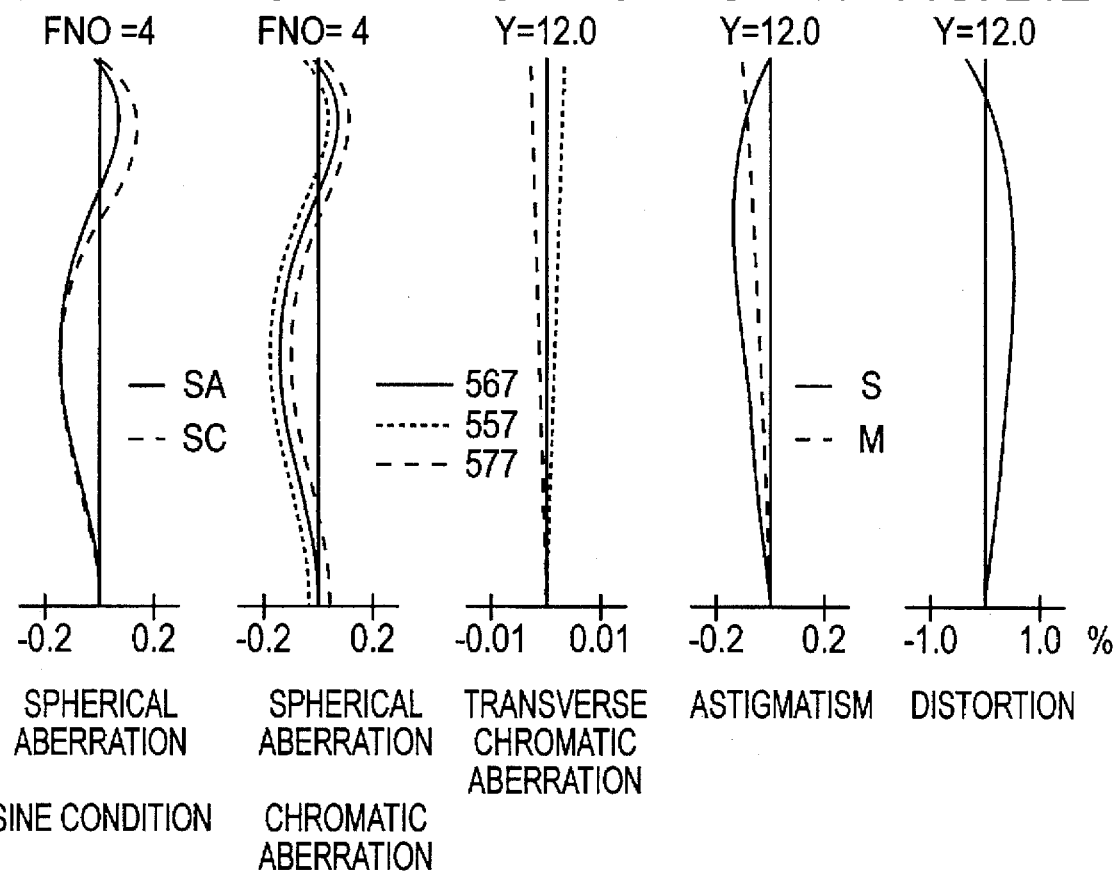
FIGS. 24A, 24B, 24C, 24D and 24E show various aberration diagrams of the lens system shown in FIG. 23.

*marked surface is aspherical.
NO.2: $K = 0.17617 \times 10$, $A4 = -0.46793 \times 10^{-3}$,
$A6 = 0.13905 \times 10^{-3}$, $A8 = -0.14918 \times 10^{-4}$,
$A10 = 0.0$, $A12 = 0.0$
NO.3: $K = 0.0$, $A4 = -0.16382 \times 10^{-2}$, $A6 = 0.10412 \times 10^{-3}$,
$A8 = -0.59664 \times 10^{-5}$, $A10 = 0.10144 \times 10^{-6}$, $A12 = 0.0$
NO.4: $K = 0.0$, $A4 = -0.82933 \times 10^{-3}$, $A6 = 0.10654 \times 10^{-4}$,
$A8 = -0.24688 \times 10^{-6}$, $A10 = -0.84195 \times 10^{-9}$, $A12 = 0.0$
amount of aspheric deviation; $\Delta X_F = 0.0779$
paraxial distance; $h = 2.64$
amount of aspheric deviation; $\Delta X_{R-1} = -0.1322$
paraxial distance; $h = 3.33$
amount of aspheric deviation; $\Delta X_{R-2} = -0.4195$
paraxial distance; $h = 4.90$ Twelfth Embodiment FIG. 23 shows a lens arrangement of an image forming lens system including a single positive meniscus composite lens with a resin layer thereon, a diaphragm, and a single plastic negative meniscus lens, arranged in this order from the object to be imaged, according to a twelfth embodiment of the present invention. The front lens group is provided on the surface thereof adjacent to the diaphragm with an aspherical surface.

Numerical data of the lens system shown in FIG. 23 is shown in Table 13 below. Diagrams of various aberrations thereof are shown in FIGS. 24A–24E, respectively.

TABLE 13

$F_{NO} = 4$
$f = 25.07$
$M = -0.112$
$Y = 12.0$
$f_B = 9.41$

| surface NO | R | d | $N_{(567\,nm)}$ | $N_d$ | $v_d$ |
|---|---|---|---|---|---|
| 1 | 5.611 | 4.26 | 1.59021 | 1.58913 | 61.2 |

TABLE 13-continued

| 2 | 6.316 | 0.10 | 1.52425 | 1.52310 | 50.8 |
| 3* | 6.316 | 1.74 | — | — | — |
| STOP | ∞ | 2.74 | — | — | — |
| 4* | −682.456 | 3.17 | 1.58761 | 1.58547 | 29.9 |
| 5* | −155.411 | — | — | — | — |

*marked surface is aspherical.
NO.3: $K = 0.22519 \times 10$, $A4 = -0.70524 \times 10^{-3}$,
  $A6 = 0.13585 \times 10^{-3}$, $A8 = -0.16325 \times 10^{-4}$,
  $A10 = 0.0$, $A12 = 0.0$
NO.4: $K = 0.0$, $A4 = -0.17170 \times 10^{-2}$, $A6 = 0.67683 \times 10^{-4}$,
  $A8 = -0.27572 \times 10^{-5}$, $A10 = -0.33622 \times 10^{-7}$, $A12 = 0.0$
NO.5: $K = 0.0$, $A4 = -0.95818 \times 10^{-3}$, $A6 = 0.11319 \times 10^{-4}$,
  $A8 = -0.14413 \times 10^{-6}$, $A10 = -0.60723 \times 10^{-8}$, $A12 = 0.0$

| amount of aspheric deviation; | $\Delta X_F = 0.0829$ |
| paraxial distance; | $h = 2.81$ |
| amount of aspheric deviation; | $\Delta X_{R-1} = -0.2227$ |
| paraxial distance; | $h = 3.57$ |
| amount of aspheric deviation; | $\Delta X_{R-2} = -0.4957$ |
| paraxial distance; | $h = 4.51$ |

Thirteenth embodiment

Figure 25:
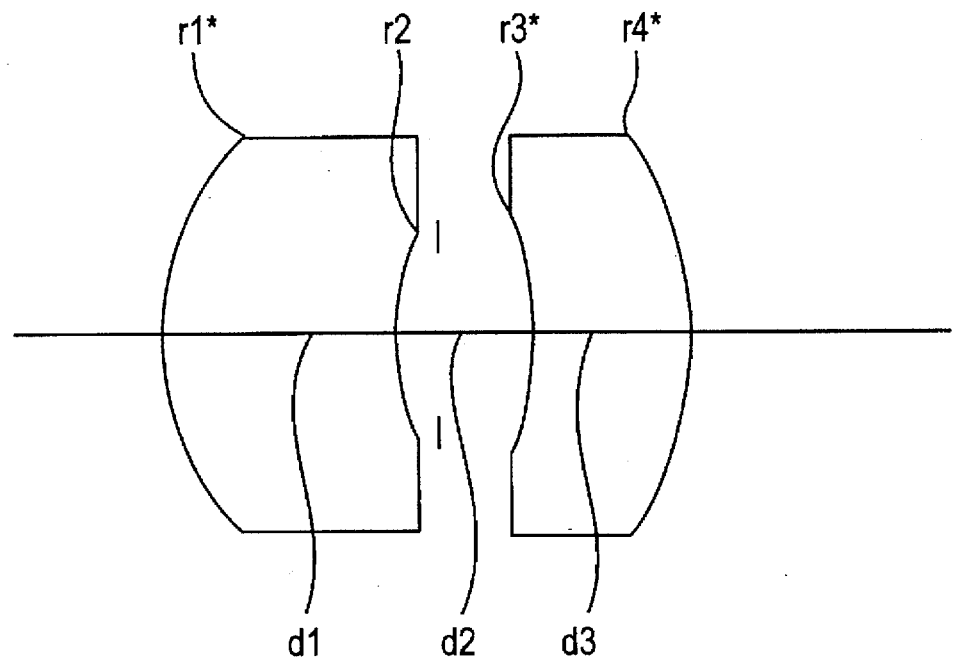
FIG. 25 is a schematic view of a lens arrangement of an image forming lens system, according to a thirteenth embodiment of the present invention.
Figures 26A, 26B, 26C, 26D, 26E:
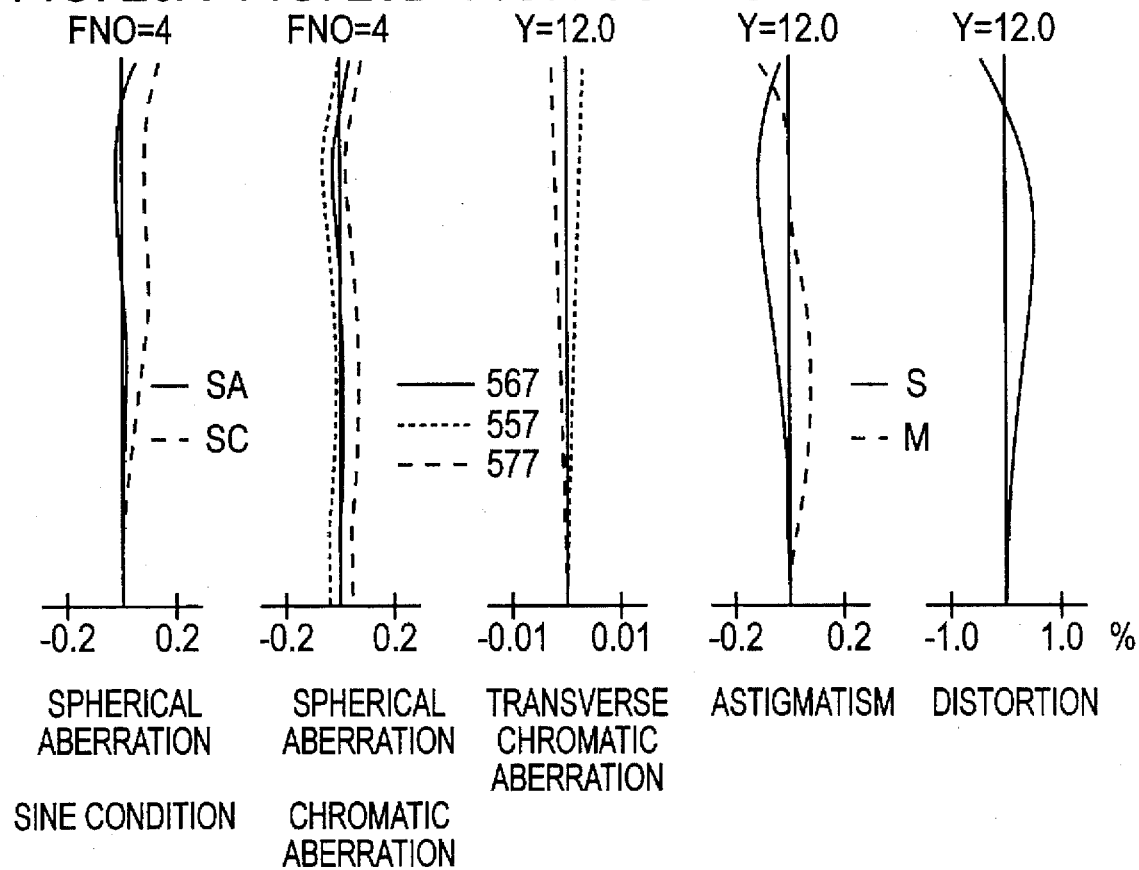
FIGS. 26A, 26B, 26C, 26D and 26E show various aberration diagrams of the lens system shown in FIG. 25.

FIG. 25 shows a lens arrangement of an image forming lens system including a single positive meniscus lens, a diaphragm, and a single plastic negative meniscus lens, arranged in this order from the object to be imaged, according to a thirteenth embodiment of the present invention. The front lens group is provided on the surface thereof adjacent to the diaphragm with an aspherical surface.

Numerical data of the lens system shown in FIG. 25 is shown in Table 14 below. Diagrams of various aberrations thereof are shown in FIGS. 26A–26E, respectively.

TABLE 14

$F_{NO} = 4$
$f = 25.06$
$M = -0.112$
$Y = 12.0$
$f_B = 9.31$

| surface NO | R | d | $N_{(567\,nm)}$ | $N_d$ | $v_d$ |
|---|---|---|---|---|---|
| 1* | 6.716 | 5.78 | 1.59021 | 1.58913 | 61.2 |
| 2 | 9.026 | 1.00 | — | — | — |
| STOP | ∞ | 2.58 | — | — | — |
| 3* | −14.801 | 3.82 | 1.49271 | 1.49176 | 57.4 |
| 4* | −16.146 | — | — | — | — |

*marked surface is aspherical.
NO.1: $K = 0.0$, $A4 = -0.26041 \times 10^{-4}$, $A6 = -0.10608 \times 10^{-5}$,
  $A8 = -0.69832 \times 10^{-7}$, $A10 = 0.0$, $A12 = 0.0$
NO.4: $K = 0.0$, $A4 = -0.25437 \times 10^{-2}$, $A6 = 0.59918 \times 10^{-4}$,
  $A8 = -0.85360 \times 10^{-5}$, $A10 = -0.53534 \times 10^{-6}$, $A12 = 0.0$
NO.5: $K = 0.0$, $A4 = -0.82273 \times 10^{-3}$, $A6 = -0.12431 \times 10^{-4}$,
  $A8 = 0.56532 \times 10^{-6}$, $A10 = -0.30394 \times 10^{-7}$, $A12 = 0.0$

| amount of aspheric deviation; | $\Delta X_F = -0.0581$ |
| paraxial distance; | $h = 4.97$ |
| amount of aspheric deviation; | $\Delta X_{R-1} = -0.3265$ |
| paraxial distance; | $h = 3.15$ |
| amount of aspheric deviation; | $\Delta X_{R-2} = -0.8082$ |
| paraxial distance; | $h = 5.03$ |

Fourteenth embodiment

Figure 27:
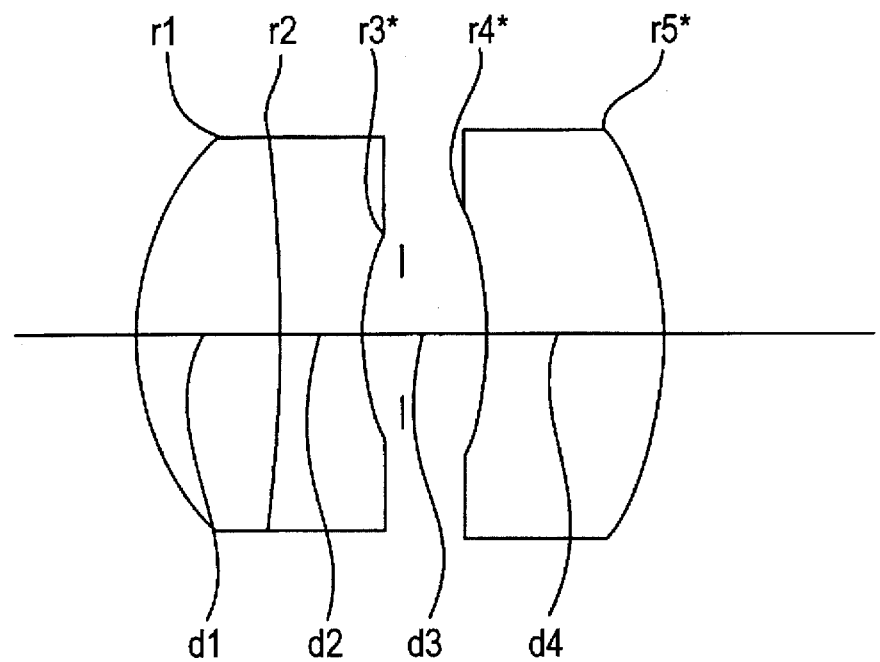
FIG. 27 is a schematic view of a lens arrangement of an image forming lens system, according to a fourteenth embodiment of the present invention.

FIG. 27 shows a lens arrangement of an image forming lens system including a cemented lens consisting of a positive lens and a negative lens, a diaphragm, and a single plastic negative meniscus lens, arranged in this order from the object to be imaged, according to a fourteenth embodiment of the present invention. The front lens group is provided on the surface thereof adjacent to the diaphragm with an aspherical surface.

Figures 28A, 28B, 28C, 28D, 28E:
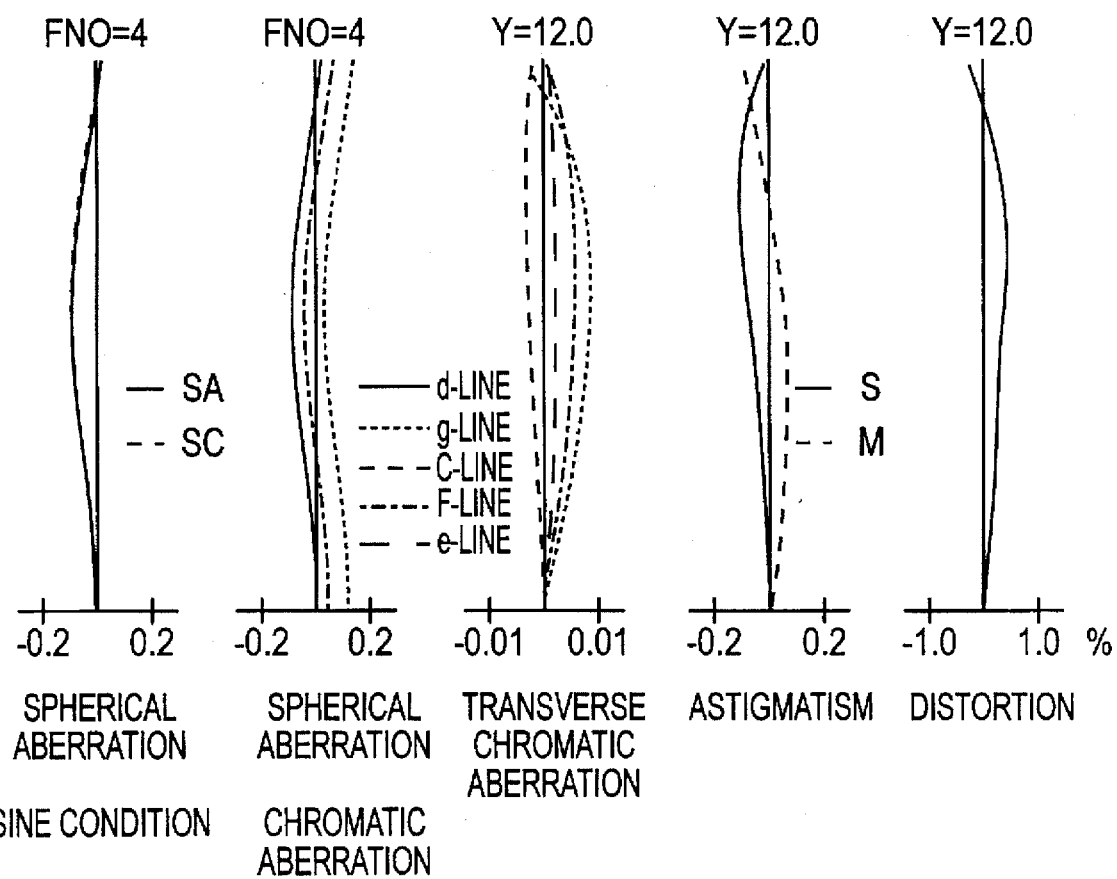
FIGS. 28A, 28B, 28C, 28D and 28E show various aberration diagrams of the lens system shown in FIG. 27.
Figure 31:
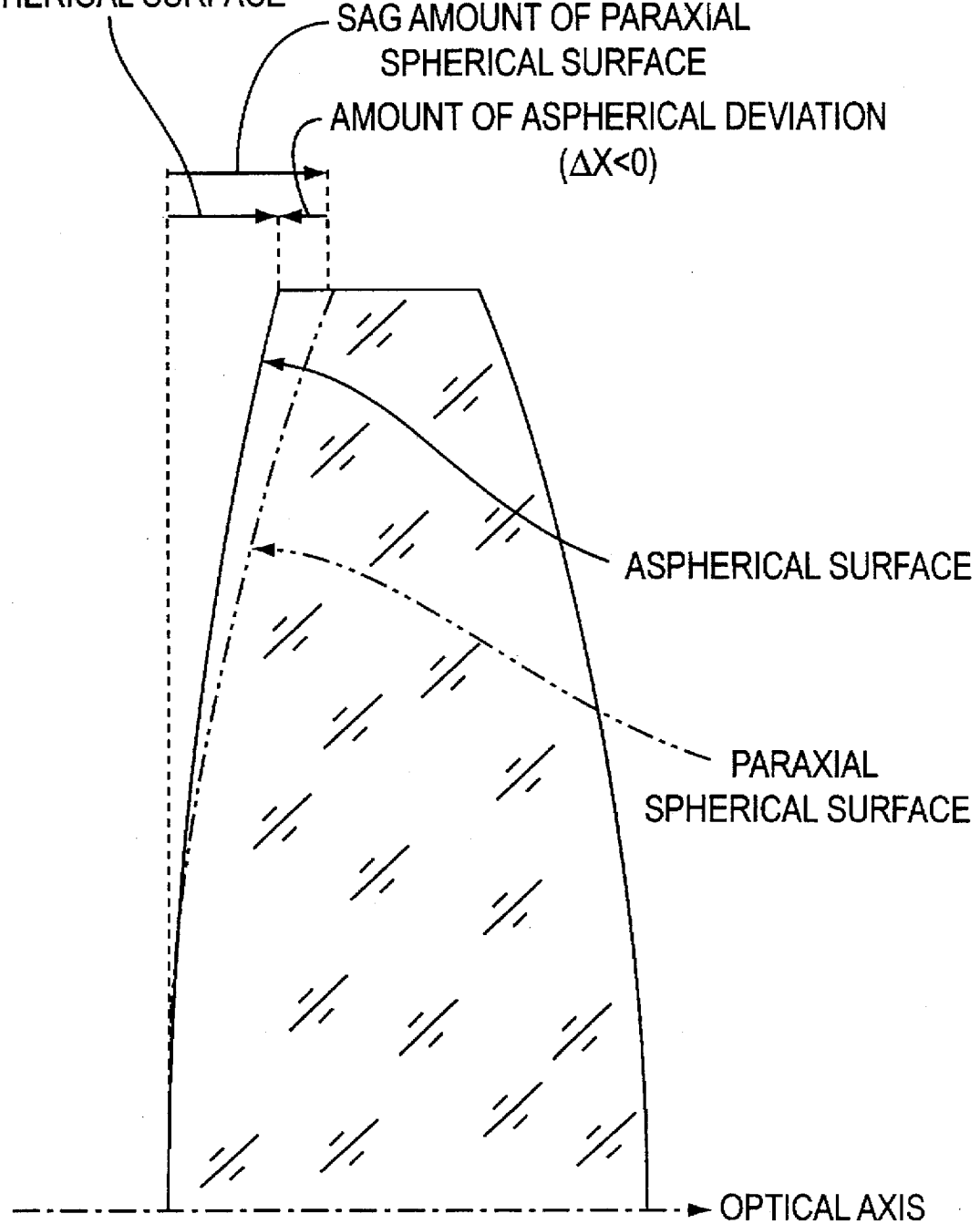

Numerical data of the lens system shown in FIG. 27 is shown in Table 15 below. Diagrams of various aberrations thereof are shown in FIG. 28, respectively.

TABLE 15

$F_{NO} = 4$
$f = 24.98$
$M = -0.112$
$Y = 12.0$
$f_B = 9.55$

| surface NO | R | d | $N_{(567\,nm)}$ | $N_d$ | $v_d$ |
|---|---|---|---|---|---|
| 1 | 6.727 | 3.62 | — | 1.65160 | 58.5 |
| 2 | −38.671 | 2.12 | — | 1.68893 | 31.1 |
| 3* | 8.439 | 0.87 | — | — | — |
| STOP | ∞ | 2.20 | — | — | — |
| 4* | −14.196 | 4.50 | — | 1.49176 | 57.4 |
| 5* | −13.536 | — | — | — | — |

*marked surface is aspherical.
NO.3: $K = 0.27111 \times 10$, $A4 = -0.60131 \times 10^{-3}$,
  $A6 = 0.71143 \times 10^{-4}$, $A8 = -0.91216 \times 10^{-5}$,
  $A10 = 0.0$, $A12 = 0.0$
NO.4: $K = 0.0$, $A4 = -0.21766 \times 10^{-2}$, $A6 = 0.12394 \times 10^{-3}$,
  $A8 = -0.28308 \times 10^{-4}$, $A10 = 0.79603 \times 10^{-6}$, $A12 = 0.0$
NO.5: $K = 0.0$, $A4 = -0.61898 \times 10^{-3}$, $A6 = -0.59470 \times 10^{-5}$,
  $A8 = 0.61977 \times 10^{-7}$, $A10 = -0.13935 \times 10^{-7}$, $A12 = 0.0$

| amount of aspheric deviation; | $\Delta X_F = 0.0072$ |
| paraxial distance; | $h = 2.44$ |
| amount of aspheric deviation; | $\Delta X_{R-1} = -0.2332$ |
| paraxial distance; | $h = 3.02$ |
| amount of aspheric deviation; | $\Delta X_{R-2} = -0.6764$ |
| paraxial distance; | $h = 5.12$ |

Fifteenth embodiment

FIG. 29 shows a lens arrangement of an image forming lens system including a cemented lens consisting of a positive lens and a negative lens, a diaphragm, and a single plastic negative meniscus lens, arranged in this order from the object to be imaged, according to a fourteenth embodiment of the present invention. The front lens group is provided on the surface thereof adjacent to the diaphragm with an aspherical surface.

Numerical data of the lens system shown in FIG. 29 is shown in Table 16 below. Diagrams of various aberrations thereof are shown in FIGS. 30A–30E, respectively.

TABLE 16

$F_{NO} = 4$
$f = 24.98$
$M = -0.112$
$Y = 12.0$
$f_B = 8.75$

| surface NO | R | d | $N_{(567\,nm)}$ | $N_d$ | $v_d$ |
|---|---|---|---|---|---|
| 1 | 6.563 | 3.93 | — | 1.60311 | 60.7 |
| 2 | −25.879 | 2.25 | — | 1.68893 | 31.1 |
| 3* | 9.317 | 0.90 | — | — | — |
| STOP | ∞ | 2.15 | — | — | — |
| 4* | −26.030 | 4.50 | — | 1.49176 | 57.4 |
| 5* | −23.303 | — | — | — | — |

*marked surface is aspherical.
NO.3: $K = 0.26942 \times 10$, $A4 = -0.46457 \times 10^{-3}$,
  $A6 = 0.12285 \times 10^{-3}$, $A8 = -0.12893 \times 10^{-4}$,
  $A10 = 0.0$, $A12 = 0.0$
NO.4: $K = 0.0$, $A4 = -0.20256 \times 10^{-2}$, $A6 = 0.88731 \times 10^{-4}$,
  $A8 = -0.14103 \times 10^{-4}$, $A10 = 0.33033 \times 10^{-6}$, $A12 = 0.0$
NO.5: $K = 0.0$, $A4 = -0.64211 \times 10^{-3}$, $A6 = -0.42292 \times 10^{-5}$,
  $A8 = 0.35026 \times 10^{-7}$, $A10 = -0.65725 \times 10^{-8}$, $A12 = 0.0$

| amount of aspheric deviation; | $\Delta X_F = 0.0109$ |
| paraxial distance; | $h = 2.44$ |
| amount of aspheric deviation; | $\Delta X_{R-1} = -0.1996$ |

TABLE 16-continued

| | |
|---|---|
| paraxial distance; | h = 3.09 |
| amount of aspheric deviation; | $\Delta X_{R-2} = -0.6175$ |
| paraxial distance; | h = 5.18 |

Values of the above-mentioned formulae in the 10th to 15th embodiments are shown in Table 17 below. Note that values in formula (1) are not absolute values.

TABLE 17

| | Embodiment | | | |
|---|---|---|---|---|
| | 10 | 11 | 12 | 13 |
| formula (1) | 0.143 | 0.126 | 0.073 | -0.069 |
| formula (17) | 1.517 | 1.590 | 1.590 | 1.590 |
| formula (18) (× 10⁻²) | -1.192 | -0.790 | -0.688 | -0.511 |
| formula (3) (× 10⁻³) | -3.641 | -5.273 | -8.883 | -13.03 |
| formulae(4) (× 10⁻²) | -1.283 | -1.673 | -1.977 | -3.225 |
| formulae(19)(20)(21) | -22.5 | -9.96 | -6.60 | -1.72 |
| formulae(6b) | -5.64 | -9.65 | -12.1 | -13.5 |
| formulae(7b) | 1.00 | 1.09 | 1.47 | 1.39 |
| formulae(9b) | 64.1 | 61.2 | 61.2 | 61.2 |
| formulae(12b) | — | — | — | — |

| | Embodiment | |
|---|---|---|
| | 14 | 15 |
| formulae(1) | 0.042 | 0.055 |
| formulae(17) | 1.652 | 1.603 |
| formulae(18) (× 10⁻²) | 0.059 | -0.081 |
| formulae(3) (× 10⁻³) | 9.335 | -7.990 |
| formulae(4) (× 10⁻²) | 2.708 | -2.472 |
| formulae(19)(20)(21) | — | — |
| formulae(6b) | 2.5 | -0.9 |
| formulae(7b) | 1.15 | 1.02 |
| formulae(9b) | 8.5 | 60.7 |
| formulae(12b) | 27.4 | 29.6 |

As can be seen from Table 17 above, values in the 10th to 13th embodiments satisfy the requirements defined in formulae (1), (3), (4), (17) and (18), (6b), (7b) and (9b). Moreover, the 10th to 15th embodiments satisfy the requirements defined by formula (1) and formula (17). The 14th and 15th embodiment satisfy the requirements defined by formula (12b).

As can be understood from the above discussion, according to the second aspect of the present invention, since the number of the lenses is reduced and the lens arrangement is partly comprised of a plastic lens, the manufacturing cost can be reduced. Moreover, various aberrations can be effectively corrected. In addition, a lens system obtained by the present invention has a half angle of view of about 24°, particularly at an f-number of 4 and can be advantageously used for an optical reader in a facsimile.

We claim:

1. An image forming lens system comprising a positive front lens group, a diaphragm, and a rear lens group, in this order from an object to be imaged, wherein said front lens group is made of optical glass, and said rear lens group comprises a single meniscus plastic lens having opposed aspherical lens surfaces with a concave surface adjacent to said diaphragm, and wherein the following relationships are satisfied:

$f_0 \cdot |1/f_{R-1} + 1/f_{R-2}| < 0.3$ $-4 < f_0/r_{R-1} < -0.7$ $\Delta X_{R-1}/f_0 < 0$ $\Delta X_{R-2}/f_0 < 0$ $0.1 < d_R/f_0$ wherein $f_{R-1}$ represents a focal length of the first surface of the plastic lens;

$f_{R-2}$ represents a focal length of the second surface of the plastic lens;

$f_0$ represents a focal length of the whole lens system;

n represents a refractive index of the plastic lens at a reference wavelength;

$r_{R-1}$ represents a radius of curvature of the first surface of the single meniscus plastic lens;

$r_{R-2}$ represents a radius of curvature of the second surface of the single meniscus plastic lens;

$\Delta X_{R-1}$ represents a amount of aspheric deviation of the first surface of the plastic lens at an effective radius thereof;

$\Delta X_{R-2}$ represents a amount of aspheric deviation of the second surface of the plastic lens at an effective radius thereof; and $d_R$ represents a thickness of the plastic lens.

2. An image forming lens system according to claim 1, wherein said aspherical lens surface of said plastic lens satisfies the following relationship:

$-20 < \Delta I_{R-1} < -3$ $0.2 < \Delta III_{R-2} < 1.5$ wherein $\Delta I_{R-1}$: coefficient of aberration of the aspherical surface term of the coefficient of spherical aberration of the first lens surface of the plastic lens;

$\Delta III_{R-2}$: coefficient of aberration of the aspherical surface term of the coefficient of astigmatism of the second lens surface of the plastic lens.

3. An image forming lens system according to claim 1, wherein said positive front lens group comprises one positive meniscus lens with a concave surface adjacent to said diaphragm and satisfies the following relationship:

$1.7 < N_P$ wherein $N_P$: refractive index of the positive meniscus lens at a reference wavelength.

4. An image forming lens system according to claim 3, wherein the following relationship is satisfied:

$35 < \nu_P$ wherein $\nu_P$: Abbe number of the positive meniscus lens at the d-line.

5. An image forming lens system according to claim 1, wherein said positive front lens group is made of a positive lens and a negative lens.

6. An image forming lens system according to claim 5, wherein the following relationships are satisfied:

$1.7 < N_P$ $1.7 < N_N$ $10 < \nu_P - \nu_N$ wherein $N_P$: refractive index of the positive lens of the front lens group at the d-line;

$N_N$: refractive index of the negative lens of the front lens group at the d-line;

$\nu_P$: Abbe number of the positive lens of the front lens group at the d-line;

$v_N$: Abbe number of the negative lens of the front lens group at the d-line.

7. An image forming lens system according to claim 3, wherein said front lens group is made of optical glass having spherical lens surfaces.

8. An image forming lens system according to claim 5, wherein said front lens group is made of optical glass having spherical lens surfaces.

9. An image forming lens system according to claim 1, wherein the following relationship is satisfied:

$0.1 < d_R/f_0 < 0.39$.

10. An image forming lens system according to claim 1, wherein the following relationships are satisfied:

$0 < S_{R-1}/-r_{R-1} < 0.3$
$0.4 < (S_{R-1}+d_R)/-r_{R-2} < 1.0$ wherein $S_{R-1}$: distance between the diaphragm and the first surface of the rear lens group;

$S_{R-1}+d_R$: distance between the diaphragm and the second surface of the rear lens groups.

11. An image forming lens system comprising a positive front lens group, a diaphragm, and a rear lens group, in this order from an object to be imaged, wherein said front lens group comprises one positive lens of optical glass, said rear lens group comprises one meniscus lens having a concave surface adjacent to said diaphragm, and wherein the following relationships are satisfied:

$f_0 \cdot |1/f_{R-1}+1/f_{R-2}| < 0.3$
$-4 < f_0/r_{R-1} < -0.7$
$0.1 < d_R/f_0$
$45 < v_P$
$v_R < 34$ wherein $v_P$ represents an Abbe number of the positive lens of the front lens group at the d-line;

$f_{R-1}$ represents a focal length of the first surface of the plastic lens;

$f_{R-2}$ represents a focal length of the second surface of the plastic lens;

$f_0$ represents a focal length of the whole lens system;

n represents a refractive index of the plastic lens at a reference wavelength;

$r_{R-1}$ represents a radius of curvature of the first surface of the single meniscus plastic lens;

$r_{R-2}$ represents a radius of curvature of the second surface of the single meniscus plastic lens;

$d_R$ represents a thickness of the plastic lens; and $v_R$ represents an Abbe number of the rear lens group at the d-line.

12. An image forming lens system according to claim 11, wherein said rear lens group is made of a plastic lens having opposed aspherical lens surfaces and satisfies the following relationships:

$\Delta X_{R-1}/f_0 < 0$
$\Delta X_{R-2}/f_0 < 0$.

13. An image forming lens system according to claim 11, wherein said positive front lens group is made of one positive meniscus lens having a concave surface adjacent to the diaphragm and satisfies the following relationship:

$1.7 < N_P$ wherein $N_P$: refractive index of the positive lens of the front lens group at the d-line.

14. An image forming lens system according to claim 13, wherein said positive lens group is made of optical glass having spherical lens surfaces.

15. An image forming lens system according to claim 11, wherein the following relationship is satisfied:

$0.1 < d_R/f_0 < 0.39$.

16. An image forming lens system comprising a positive front lens group comprising a positive lens, a diaphragm, and a rear lens group, in this order from an object to be imaged, wherein said front lens group is provided with at least one aspherical surface, said rear lens group comprising one plastic lens having opposed aspheric surfaces, and wherein the following relationships are satisfied:

$f_0 \cdot |1/f_{R-1}+1/f_{R-2}| < 0.3$
$\Delta X_{R-1}/f_0 < 0$
$\Delta X_{R-2}/f_0 < 0$
$1.5 < n_P < 1.7$
$\Delta X_F/f_F < 0$ wherein $f_0$ represents a focal length of the whole lens system;

$f_{R-1}$ represents a focal length of the first surface of the plastic lens;

$f_{R-2}$ represents a focal length of the second surface of the plastic lens;

n represents a refractive index of the plastic lens at a reference wavelength;

$r_{R-1}$ represents a radius of curvature of the first surface of the plastic lens;

$r_{R-2}$ represents a radius of curvature of the second surface of the plastic lens;

$n_P$ represents a refractive index of the positive lens of the front lens group at a reference wavelength;

$\Delta X_F$ represents an amount of aspheric deviation of the aspherical surface of the front lens group at an effective radius thereof;

$f_F$ represents a focal length of the aspherical surface of the front lens group;

$\Delta X_{R-1}$ represents an amount of aspheric deviation of the first surface of the plastic lens at an effective radius thereof; and $\Delta X_{R-2}$ represents an amount of aspheric deviation of the second surface of the plastic lens at an effective radius thereof.

17. An image forming lens system according to claim 16, wherein said positive front lens group is made of one aspherical lens of optical glass and satisfies the following relationship:

$-30 < \Delta I_F < 0$ wherein $\Delta I_F$: coefficient of aberration of the aspherical surface term of the coefficient of spherical aberration of the aspherical surface of the front lens group.

18. An image forming lens system according to claim 16, wherein the rear plastic lens group is made of a single composite aspherical lens having one spherical optical glass coated with a resin layer thereon and satisfies the following relationship:

$-30 < \Delta I_F < 0$ wherein $\Delta I_F$: coefficient of aberration of the aspherical surface term of the coefficient of spherical aberration of the aspherical surface of the front lens group.

19. An image forming lens system according to claim 16, wherein said rear plastic lens group satisfies the following relationship:

$-20 < \Delta I_{R-1} < 0$
$0.5 < \Delta III_{R-2} < 2.0$ wherein $\Delta I_{R-1}$: coefficient of aberration of the aspherical surface term of the coefficient of spherical aberration of the first lens surface of the plastic lens;

$\Delta III_{R-2}$: coefficient of aberration of the aspherical surface term of the coefficient of astigmatism of the second lens surface of the plastic lens.

20. An image forming lens system according to claim 17, wherein the Abbe number of said positive front lens group at the d-line is defined by:

$50 < \nu_P$ wherein $\nu_P$: Abbe number of the positive lens of the front lens group at the d-line.

21. An image forming lens system according to claim 18, wherein said Abbe number of said positive front lens group at the d-line is defined by:

$50 < \nu_P$ wherein $\nu_P$: Abbe number of the positive lens of the front lens group at the d-line.

22. An image forming lens system according to claim 16, wherein said front lens group is made of a positive lens and a negative lens and satisfies the following relationship:

$50 < \nu_P$ $15 < \nu_P - \nu_N$ wherein $\nu_N$: Abbe number of the negative lens of the front lens group at the d-line.

23. An image forming lens system according to claim 17, wherein said front lens group is provided with an aspherical concave surface located adjacent to the diaphragm and satisfies the following relationship:

$-30 < \Delta I_F < -5$.

24. An image forming lens system according to claim 18, wherein said front lens group is provided with an aspherical concave surface located adjacent to the diaphragm and satisfies the following relationship:

$-30 < \Delta I_F < -5$.

25. An image forming lens system according to claim 17, wherein said front lens group is provided with an aspherical convex surface located adjacent to an object to be imaged and satisfies the following relationship:

$-5 < \Delta I_F < 0$.

26. An image forming lens system according to claim 18, wherein said front lens group is provided with an aspherical convex surface located adjacent to an object to be imaged and satisfies the following relationship:

$-5 < \Delta I_F < 0$.

* * * * *

UNITED STATES PATENT AND TRADEMARK OFFICE
CERTIFICATE OF CORRECTION

PATENT NO. : 5,677,798
DATED : October 14, 1997
INVENTOR(S) : HIRANO et al.

It is certified that error appears in the above-identified patent and that said Letters Patent is hereby corrected as shown below:

At column 23, line 32, (claim 11, line 12), change "$v_R<34$" to ---$v_R<35$---.

Signed and Sealed this

Eleventh Day of August 1998

Attest:

BRUCE LEHMAN

Attesting Officer           Commissioner of Patents and Trademarks